(12) United States Patent
Mizumoto et al.

(10) Patent No.: US 6,550,056 B1
(45) Date of Patent: Apr. 15, 2003

(54) SOURCE LEVEL DEBUGGER FOR DEBUGGING SOURCE PROGRAMS

(75) Inventors: Katsuya Mizumoto, Tokyo (JP); Ryosuke Okuda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/453,964

(22) Filed: Dec. 3, 1999

(30) Foreign Application Priority Data

Jul. 19, 1999 (JP) .......................................... 11-205178

(51) Int. Cl.⁷ ............................................... G06F 9/44
(52) U.S. Cl. ........................ 717/124; 717/128; 719/129
(58) Field of Search ................................ 717/124, 125, 717/126, 127, 128, 129, 143, 140, 149; 702/119; 714/799

(56) References Cited

U.S. PATENT DOCUMENTS

| | | | | |
|---|---|---|---|---|
| 5,175,856 A | * | 12/1992 | Van Dyke et al. .......... | 717/151 |
| 5,179,702 A | * | 1/1993 | Spix et al. .................. | 709/102 |
| 5,446,900 A | * | 8/1995 | Kimelman ................... | 717/124 |
| 5,488,688 A | * | 1/1996 | Gonzales et al. ............ | 714/34 |
| 5,737,516 A | * | 4/1998 | Circello et al. .............. | 714/38 |
| 5,740,440 A | * | 4/1998 | West .......................... | 717/125 |
| 5,943,498 A | * | 8/1999 | Yano et al. .................. | 717/128 |
| 5,983,017 A | * | 11/1999 | Kemp et al. ................. | 717/129 |
| 6,035,422 A | * | 3/2000 | Hohl et al. ................... | 714/35 |
| 6,145,122 A | * | 11/2000 | Miller et al. ................. | 717/129 |
| 6,151,701 A | * | 11/2000 | Humphreys et al. ........ | 717/130 |
| 6,161,216 A | * | 12/2000 | Shagam ....................... | 717/128 |
| 6,173,386 B1 | * | 1/2001 | Key et al. .................... | 712/10 |
| 6,178,547 B1 | * | 1/2001 | Pennello ...................... | 717/124 |
| 6,253,368 B1 | * | 6/2001 | Nelin et al. .................. | 717/124 |
| 6,091,896 A1 | * | 7/2001 | Curreri et al. ............... | 717/125 |
| 6,353,923 B1 | * | 3/2002 | Bogle et al. ................. | 717/128 |

FOREIGN PATENT DOCUMENTS

| | | |
|---|---|---|
| JP | 5-224987 | 9/1993 |
| JP | 9-244912 | 9/1997 |

OTHER PUBLICATIONS

Mukherjea et al., "Applying algorithm animation techniques for program tracing, debugging and understanding", IEEE, pp. 456–465, 1993.*
Cohn, "Source level debugging of automatically parallelized code", ACM pp. 132–143, 1991.*
Bruegge, "Program development for a systolic array", ACM pp. 31–41, 1988.*
Pancake et al., "Modlela for visualization in parallel debuggers", ACM pp. 627–636, 1989.*
Bruegge et al., "A program degugger for a systolic array: design and implemenation", ACM SIGPLAN on parallel & distributed debugging, vol. 24, No. 1, Nov. 1998.*

* cited by examiner

Primary Examiner—Anil Khatri
(74) Attorney, Agent, or Firm—Burns, Doane, Swecker & Mathis, LLP

(57) ABSTRACT

A source-level debugger debugs a source program for computers using a pipeline control method. The debugger includes a not-yet-processed instruction analyzing unit for analyzing each of instructions including not-yet-process stages in a pipeline when execution of a source program is halted (or suspended) or terminated, and for acquiring information on an internal state of the pipeline. A user interface unit displays the information on the internal state of the pipeline acquired by the not-yet-processed instruction analyzing unit in a predetermined display form on the screen of a display unit.

17 Claims, 18 Drawing Sheets

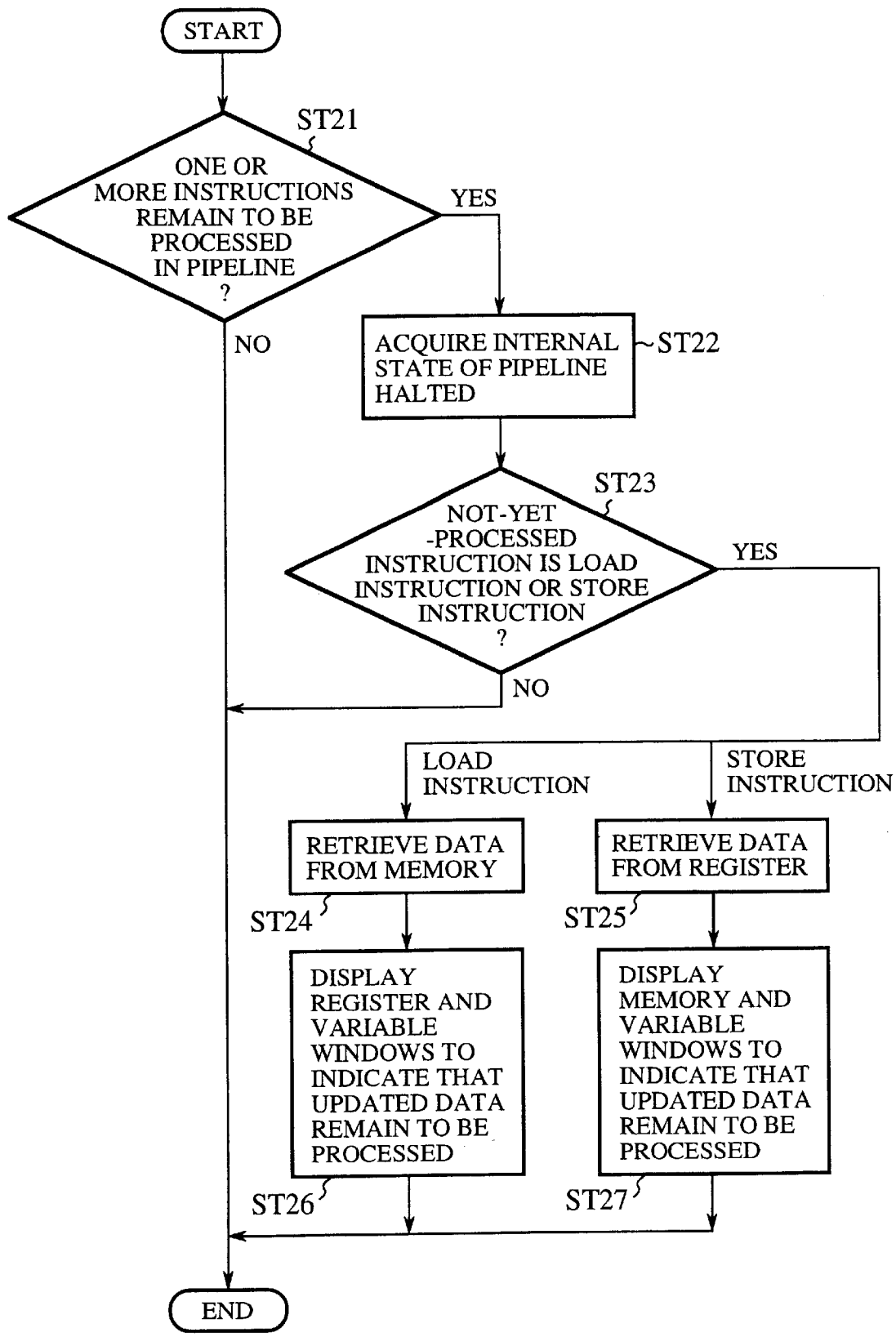

FIG.3 (a)

MEMORY WINDOW

|  | +0 | +1 | +2 | +3 | +4 | +5 | +6 | +7 | +8 | +9 | +A | +B | +C | +D | +E | +F |
|---|---|---|---|---|---|---|---|---|---|---|---|---|---|---|---|---|
| 00FF00 | 00 | 00 | 00 | 00 | 00 | 00 | 00 | 00 | 00 | 00 | 00 | 00 | 00 | 00 | 00 | 00 |
| 00FF10 | 00 | 00 | 00 | 00 | 00 | 00 | 00 | 00 | 00 | 00 | 00 | 00 | 00 | 00 | 00 | 00 |
| 00FF20 | 00 | 00 | 00 | 00 | 00 | 00 | 00 | 00 | 00 | 00 | 00 | 00 | 00 | 00 | 00 | 00 |
| 00FF30 | 00 | 00 | 00 | 00 | 00 | 00 | 00 | 00 | 00 | 00 | 00 | 00 | 00 | 00 | 00 | 00 |
| 00FF40 | 00 | 00 | 00 | 00 | 00 | 00 | 00 | 00 | 00 | 00 | 00 | 00 | 00 | 00 | 00 | 00 |
| 00FF50 | 00 | 00 | 00 | 00 | 00 | 00 | 00 | 00 | 00 | 00 | 00 | 00 | 00 | 00 | 00 | 00 |

100

DATA TO BE UPDATED IS BLINKED AND/OR DISPLAYED IN A DIFFERENT COLOR SO THAT A DISTINCTION IS MADE BETWEEN THE DATA AND OTHER DATA

FIG.3 (c)

VARIABLE WINDOW

| i | 001E |
| j | =0000 |
| loop | 00000000 |
| Cont | 00000000 |
| SUM | 000000000000000 |
| P.X | 00000000 |
| P.Y | 00000000 |
| name | 00000000 |
| Head | 00000000 |
| tmp | 00000000 |

REGISTER WINDOW

| PC | 00000000 | CYC | 00000000 |
| RD | 00000000 | R8 | 00000000 |
| R1 | 00000000 | R9 | 00000000 |
| R2 | 00000000 | R10 | 00000000 |
| R3 | 00000000 | R11 | 00000000 |
| R4 | 00000000 | R12 | 00000000 |
| R5 | =00000000 | R13 | 00000000 |
| R6 | 00000000 | R14 | 00000000 |
| R7 | 00000000 | R15 | 00000000 |
| PSM | 00000000 | CBR | 00000000 |

MEMORY WINDOW

|        | +0 | +1 | +2 | +3 | +4 | +5 | +6 | +7 | +8 | +9 | +A | +B | +C | +D | +E | +F |
|--------|----|----|----|----|----|----|----|----|----|----|----|----|----|----|----|----|
| 00FF00 | 00 | 00 | 00 | 00 | 00 | 00 | 00 | 00 | 00 | 00 | 00 | 00 | 00 | 00 | 00 | 00 |
| 00FF10 | 00 | 00 | 00 | 00 | 00 | 00 | 00 | 00 | 00 | 00 | 00 | 00 | 00 | 00 | 00 | 00 |
| 00FF20 | 00 | 00 | 00 | 00 | 00 | 00 | 00 | 00 | 00 | 00 | 00 | 00 | 00 | 00 | 00 | 00 |
| 00FF30 | 00 | 00 | 00 | 00 | 00 | 00 | 00 | 00 | 00 | 00 | 00 | 00 | 00 | 00 | 00 | 00 |
| 00FF40 | 00 | 00 | 00 | 00 | 00 | 00 | 00 | 00 | 00 | 00 | 00 | 00 | 00 | 00 | 00 | 00 |
| 00FF50 | 00 | 00 | 00 | 00 | 00 | 00 | 00 | 00 | 00 | 00 | 00 | 00 | 00 | 00 | 00 | 00 |

DATA TO BE UPDATED IS UNDERLINED SO THAT A DISTINCTION IS MADE BETWEEN THE DATA AND OTHER DATA

FIG.4 (b)

REGISTER WINDOW

| PC  | 00000000 | CYC | 00000000 |
|-----|----------|-----|----------|
| RD  | 00000000 | R8  | 00000000 |
| R1  | 00000000 | R9  | 00000000 |
| R2  | 00000000 | R10 | 00000000 |
| R3  | 00000000 | R11 | 00000000 |
| R4  | 00000000 | R12 | 00000000 |
| R5  | 00000000 | R13 | 00000000 |
| R6  | 00000000 | R14 | 00000000 |
| R7  | *00000000* | R15 | 00000000 |
| PSM | 00000000 | CBR | 00000000 |

FIG.4 (c)

VARIABLE WINDOW

| i    | 001F             |
| j    | 0000             |
| loop | 00000000         |
| Cont | 00000000         |
| SUM  | 0000000000000000 |
| P.X  | 00000000         |
| P.Y  | 00000000         |
| name | 00000000         |
| Head | 00000000     |
| tmp  | 00000000         |

DATA TO BE UPDATED IS DISPLAYED IN A DIFFERENT FONT SO THAT A DISTINCTION IS MADE BETWEEN THE DATA AND OTHER DATA

FIG.5 (a)

MEMORY WINDOW

| | +0 | +1 | +2 | +3 | +4 | +5 | +6 | +7 | +8 | +9 | +A | +B | +C | +D | +E | +F |
|---|---|---|---|---|---|---|---|---|---|---|---|---|---|---|---|---|
| 00FF00 | 00 | 00 | 00 | 00 | 00 | 00 | 00 | 00 | 00 | 00 | 00 | 00 | 00 | 00 | 00 | 00 |
| 00FF10 | 00 | 00 | 00 | 00 | 00 | 00 | 00 | 00 | 00 | 00 | 00 | 00 | 00 | 00 | 00 | 00 |
| 00FF20 | 00 | 00 | 00 | 00 | 00 | 00 | 00 | 00 | 00 | 00 | 00 | 00 | 00 | 00 | 00 | 00 |
| 00FF30 | 00 | 00 | 00 | 00 | 00 | 00 | 00 | 00 | 00 | 00 | 00 | 00 | 00 | 00 | 00 | 00 |
| 00FF40 | 00 | 00 | 00 | 00 | 00 | 00 | 00 | 00 | 00 | 00 | 00 | 00 | 00 | 00 | 00 | 00 |
| 00FF50 | 00 | 00 | 00 | 00 | 00 | 00 | 00 | 00 | 00 | 00 | 00 | 00 | 00 | 00 | 00 | 00 |

→ DATA TO BE UPDATED

ADDRESS OF DATA TO BE UPDATED IS UNDERLINED SO THAT A DISTINCTION IS MADE BETWEEN THE ADDRESS AND OTHER ADDRESSES

FIG.5 (b)

REGISTER WINDOW

| PC | 00000000 | CYC | 00000000 |
|---|---|---|---|
| RD | 00000000 | R8 | 00000000 |
| R1 | 00000000 | R9 | 00000000 |
| R2 | 00000000 | R10 | 00000000 |
| R3 | 00000000 | R11 | 00000000 |
| R4 | 00000000 | R12 | 00000000 |
| R5 | 00000000 | R13 | 00000000 |
| R6 | 00000000 | R14 | 00000000 |
| *R7* | *00000000* | R15 | 00000000 |
| PSM | 00000000 | CBR | 00000000 |

DATA TO BE UPDATED AND REGISTER'S NAME ARE DISPLAYED IN A DIFFERENT FONT SO THAT A DISTINCTION IS MADE BETWEEN THE DATA AND OTHER DATA

FIG.5 (c)

VARIABLE WINDOW

| i | 001F |
|---|---|
| j | 0000 |
| loop | 00000000 |
| Cont | 00000000 |
| SUM | 0000000000000000 |
| P.X | 00000000 |
| P.Y | 00000000 |
| name | 00000000 |
| *Head* | *00000000* |
| tmp | 00000000 |

VARIABLE'S NAME CORRESPONDING TO DATA TO BE UPDATED IS DISPLAYED IN A DIFFERENT FONT SO THAT A DISTINCTION IS MADE BETWEEN THE DATA AND OTHER DATA

FIG.6 (a)

MEMORY WINDOW

| | +0 | +1 | +2 | +3 | +4 | +5 | +6 | +7 | +8 | +9 | +A | +B | +C | +D | +E | +F |
|---|---|---|---|---|---|---|---|---|---|---|---|---|---|---|---|---|
| 00FF00 | 00 | 00 | 00 | 00 | 00 | 00 | 00 | 00 | 00 | 00 | 00 | 00 | 00 | 00 | 00 | 00 |
| 00FF10 | 00 | 00 | 00 | 00 | 00 | 00 | 00 | 00 | 00 | 00 | 00 | 00 | 00 | 00 | 00 | 00 |
| 00FF20 | 00 | 00 | 00 | 00 | 00 | 00 | 00 | 00 | 00 | 00 | 00 | 00 | 00 | 00 | 00 | 00 |
| 00FF30 | 00 | 00 | 00 | 00 | 00 | 00 | FF | 00 | 00 | 00 | 00 | 00 | 00 | 00 | 00 | 00 |
| 00FF40 | 00 | 00 | 00 | 00 | 00 | 00 | 00 | 00 | 00 | 00 | 00 | 00 | 00 | 00 | 00 | 00 |
| 00FF50 | 00 | 00 | 00 | 00 | 00 | 00 | 00 | 00 | 00 | 00 | 00 | 00 | 00 | 00 | 00 | 00 |

ADDRESS OF UPDATED DATA THAT REMAINS TO BE PROCESSED IN PIPELINE IS UNDERLINED

DATA (UPDATED DATA) THAT REMAINS TO BE PROCESSED IN PIPELINE

FIG.6 (b)

REGISTER WINDOW

| PC | 00000000 | CYC | 00000000 |
|---|---|---|---|
| RD | 00000000 | R8 | 00000000 |
| R1 | 00000000 | R9 | 00000000 |
| R2 | 00000000 | R10 | 00000000 |
| R3 | 00000000 | R11 | 00000000 |
| R4 | 00000000 | R12 | 00000000 |
| R5 | 00000000 | R13 | 00000000 |
| R6 | 00000000 | R14 | 00000000 |
| *R7* | *01234567* | R15 | 00000000 |
| PSM | 00000000 | CBR | 00000000 |

DATA THAT REMAINS TO BE PROCESSED IN PIPELINE AND REGISTER'S NAME ARE DISPLAYED IN A DIFFERENT FONT SO THAT A DISTINCTION IS MADE BETWEEN THE DATA AND OTHER DATA

FIG.6 (c)

VARIABLE WINDOW

| i | 001F |
|---|---|
| j | 0000 |
| loop | 00000000 |
| Cont | 00000000 |
| SUM | 0000000000000000 |
| P.X | 00000000 |
| P.Y | 00000000 |
| name | 00000000 |
| Head | AAAAFFFF |
| tmp | 00000000 |

DATA THAT REMAINS TO BE PROCESSED IN PIPELINE IS DISPLAYED IN A DIFFERENT COLOR SO THAT A DISTINCTION IS MADE BETWEEN THE DATA AND OTHER DATA

FIG.7 (a)

| | +0 | +1 | +2 | +3 | +4 | +5 | +6 | +7 |
|---|---|---|---|---|---|---|---|---|
| MEMORY WINDOW | | | | | | | | |
| 00FF00 | 00 | 00 | 00 | 00 | 00 | 00 | 00 | 00 |
| 00FF10 | 00 | 00 | 00 | 00 | 00 | 00 | 00 | 00 |
| 00FF20 | 00 | 00 | 00 | 00 | 00 | 00 | 00 | 00 |
| 00FF30 | 00 | 00 | 00 | 00 | 00 | 00 | 00 | 00 |
| 00FF40 | 00 | 00(FF) | 00 | 00 | 00 | 00 | 00 | 00 |
| 00FF50 | 00 | 00 | 00 | 00 | 00 | 00 | 00 | 00 |

DATA THAT REMAINS TO BE PROCESSED IN PIPELINE IS DISPLAYED INSIDE PARENTHESIS

FIG.7 (b)

REGISTER WINDOW

| PC | 00000000 | CYC | 00000000 |
|---|---|---|---|
| RD | 00000000 | R8 | 00000000 |
| R1 | 00000000 | R9 | 00000000 |
| R2 | 00000000 | R10 | 00000000 |
| R3 | 00000000 | R11 | 00000000 |
| R4 | 00000000 | R12 | 00000000 |
| R5 | 00000000 | R13 | 00000000 → AAAA5555 |
| R6 | 00000000 | R14 | 00000000 |
| R7 | 00000000 | R15 | 00000000 |
| PSM | 00000000 | CBR | 00000000 |

DATA THAT REMAINS TO BE PROCESSED IN PIPELINE IS DISPLAYED TO THE RIGHT OF CURRENT DATA

FIG.7 (c)

VARIABLE WINDOW

| | | | |
|---|---|---|---|
| i | 001F | | 0100 |
| j | 0000 | | |
| loop | 00000000 | | |
| Cont | 00000000 | | |
| SUM | 000000000000000 | | |
| P.X | 00000000 | | 00000010 |
| P.Y | 00000000 | | |
| name | 00000000 | | |
| Head | 00000000 | | |
| tmp | 00000000 | | |

DATA THAT REMAIN TO BE PROCESSED IN PIPELINE

FIG.10 (a)

| | +0 | +1 | +2 | +3 | +4 | +5 | +6 | +7 |
|---|---|---|---|---|---|---|---|---|
| 00FF00 | 00 | 00 | 00 | 00 | 00 | 00 | 00 | 00 |
| 00FF10 | 00 | 00 | 00 | 00 | 00 | 00 | 00 | 00 |
| 00FF20 | 00* | 00* | 00* | 00* | 00* | 00* | 00* | 00* |
| 00FF30 | 00* | 00* | 00* | 00* | 00* | 00* | 00* | 00* |
| 00FF40 | 00 | 00 | 00 | 00 | 00 | 00 | 00 | 00 |
| 00FF50 | 00 | 00 | 00 | 00 | 00 | 00 | 00 | 00 |

DATA THAT HAS BEEN TAKEN IN BY CACHE MEMORY IS MARKED WITH *

DATA THAT DOES NOT MATCH CORRESPONDING DATA STORED IN CACHE MEMORY IS DISPLAYED IN A DIFFERENT COLOR

FIG.10 (b)

| | +0 | +1 | +2 | +3 | +4 | +5 | +6 | +7 |
|---|---|---|---|---|---|---|---|---|
| 00FF00 | 00 | 00 | 00 | 00 | 00 | 00 | 00 | 00 |
| 00FF10 | 00 | 00 | 00 | 00 | 00 | 00 | 00 | 00 |
| 00FF20 | 00 | 00 | 00 | 00 | 00 | 00 | 00 | 00 |
| 00FF30 | 00 | 00 | 00 | 00* | 00* | 00* | 00* | 00* |
| 00FF40 | 00 | 00 | 00 | 00 | 00 | 00 | 00 | 00 |
| 00FF50 | 00 | 00 | 00 | 00 | 00 | 00 | 00 | 00 |

DATA THAT HAS BEEN TAKEN IN BY CACHE MEMORY IS DISPLAYED ON A GRAY BACKGROUND

DATA THAT DOES NOT MATCH CORRESPONDING DATA STORED IN CACHE MEMORY IS MARKED WITH *

FIG.11 (a)

| | +0 | +1 | +1 | +3 | +4 | +5 | +6 | +7 |
|---|---|---|---|---|---|---|---|---|
| 00FF00 | 00 | 00 | 00 | 00 | 00 | 00 | 00 | 00 |
| 00FF10 | 00 | 00 | 00 | 00 | 00 | 00 | 00 | 00 |
| 00FF20 | 00 | 00 | 00 | 00 | 00 | 00 | 00 | 00 |
| 00FF30 | 00(00) | 00(00) | 00(00) | 00(10) | 00(11) | 00(12) | 00(FF) | 00(55) |
| 00FF40 | 00(00) | 00(00) | 00(00) | 00(00) | 00(00) | 00(00) | 00(00) | 00(00) |
| 00FF50 | 00 | 00 | 00 | 00 | 00 | 00 | 00 | 00 |

MEMORY WINDOW

CORRESPONDING DATA STORED IN CACHE MEMORY IS DISPLAYED INSIDE PARENTHESIS

FIG.11 (b)

| | +0 | +1 | +1 | +3 | +4 | +5 | +6 | +7 |
|---|---|---|---|---|---|---|---|---|
| 00FF00 | 00 | 00 | 00 | 00 | 00 | 00 | 00 | 00 |
| 00FF10 | 00 | 00 | 00 | 00 | 00 | 00 | 00 | 00 |
| 00FF20 | 00 | 00 | 00 | 00 | 00 | 00 | 00 | 00 |
| 00FF30 | 00(00) | 00(00) | 00(00) | 00(10) | 00(11) | 00(12) | 00(FF) | 00(55) |
| 00FF40 | 00(00) | 00(00) | 00(00) | 00(00) | 00(00) | 00(00) | 00(00) | 00(00) |
| 00FF50 | 00 | 00 | 00 | 00 | 00 | 00 | 00 | 00 |

MEMORY WINDOW

DATA THAT HAS BEEN TAKEN IN BY CACHE MEMORY IS DISPLAYED ON A GRAY BACKGROUND

CORRESPONDING DATA STORED IN CACHE MEMORY IS DISPLAYED INSIDE PARENTHESIS

FIG.16 (a)

```
┌─────────────────────────────────────────────────┐
│ •                MAIN WINDOW              • □  │
├─────────────────────────────────────────────────┤
│  File    Edit    Debug    Tool           Help  │
│  ┌──┐ ┌────┐ ┌────┐ ┌────┐ ┌─────────┐ ┌─────────┐│
│  │GO│ │STOP│ │STEP│ │NEXT│ │STEP Inst│ │NEXT Inst││
│  └──┘ └────┘ └────┘ └────┘ └─────────┘ └─────────┘│
│   22a   22b    22c   22d     22e          22f   │
│  ┌────────────────────────────────────────────┐ │
│  │ 121 │ void GETCH()                        │▲│
│  │ 122 │ {                                   │■│
│  │ 123 │   while( read_pt == buf_pt ){       │ │
│  │ 124 │     CHKGOCAP();                     │ │
│  │ 125 │   }                                 │ │
│  │ 126 │   GETDATA = *read_pt;               │ │
│  │○▶127│  │read_pt = 0x100│                  │ │
│  │ 128 │   if(read_pt > (unsigned char *)RSVBUF_ENTADR){│
│  │ 129 │     read_pt = (unsigned char *)RSVBUF_TOPADR; │▼│
│  └────────────────────────────────────────────┘ │
│  ┌────────────────────────────────────────────┐ │
│  │ > breakpoint 127                          │▲│
│  │   set 127line                             │■│
│  │ > go                                      │ │
│  │   stop 127line                            │ │
│  │ >                                         │■│
│  └────────────────────────────────────────────┘▼│
└─────────────────────────────────────────────────┘
```

20 — MAIN WINDOW
21 — File Edit Debug Tool Help
23 — code listing
24 — command area
27a, 27b — breakpoint indicators

INDICATE THAT DATA REMAINS TO BE PROCESSED IN PIPELINE

FIG.16 (b)

```
┌─────────────────────────────────────────────────┐
│ •                MAIN WINDOW              • □  │
├─────────────────────────────────────────────────┤
│  File    Edit    Debug    Tool           Help  │
│  ┌──┐ ┌────┐ ┌────┐ ┌────┐ ┌─────────┐ ┌─────────┐│
│  │GO│ │STOP│ │STEP│ │NEXT│ │STEP Inst│ │NEXT Inst││
│  └──┘ └────┘ └────┘ └────┘ └─────────┘ └─────────┘│
│   22a   22b    22c   22d     22e          22f   │
│  ┌────────────────────────────────────────────┐ │
│  │ 121 │ void GETCH()                        │▲│
│  │ 122 │ {                                   │■│
│  │ 123 │   while( read_pt == buf_pt ){       │ │
│  │ 124 │     CHKGOCAP();                     │ │
│  │ 125 │   }                                 │ │
│  │ 126 │   GETDATA = *read_pt;               │ │
│  │○▶127│   read_pt = 0x100                   │ │
│  │ 128 │   if(read_pt > (unsigned char *)RSVBUF_ENTADR){│
│  │ 129 │     read_pt = (unsigned char *)RSVBUF_TOPADR; │▼│
│  └────────────────────────────────────────────┘ │
│  ┌────────────────────────────────────────────┐ │
│  │ > breakpoint 127                          │▲│
│  │   set 127line                             │■│
│  │ > go                                      │ │
│  │   stop 127line                            │ │
│  │ >                                         │■│
│  └────────────────────────────────────────────┘▼│
└─────────────────────────────────────────────────┘
```

FIG.23 (a)

```
┌─────────────────────────────────────────────────┐
│ •                  MAIN WINDOW              • □ │
│ File    Edit    Debug    Tool            Help   │
│ [GO][STOP][STEP][NEXT][STEP Inst][NEXT Inst][STEP CYC] │
│  22a  22b  22c  22d    22e      22f     22g    │
│   ┌─────────────────────────────────────────┐△  │
│   │121  void GETCH( )                       │■  │
│   │122  {                                   │   │
│   │123    while( read_pt == buf_pt ){       │   │
│   │124       CHKGOCAP( );                   │   │
│   │125    }                                 │   │
│   │126    GETDATA = *read_pt;               │   │
│ ○→│127   │read_ pt = 0x100│                 │   │
│   │128    if(read_pt > (unsigned char *)RSVBUF_ENTADR){│
│   │129      read pt = (unsigned char *)RSVBUF_TOPADR;  │▽
│   └─────────────────────────────────────────┘   │
│   ┌─────────────────────────────────────────┐△  │
│   │> step cycle                             │   │
│   │  1236 cycle                             │   │
│   │> step cycle                             │   │
│   │  stop 127line                           │   │
│   │>                                        │■  │
│   └─────────────────────────────────────────┘▽  │
└─────────────────────────────────────────────────┘
```

FIG.23 (b)     INDICATE THAT DATA REMAINS TO BE PROCESSED IN PIPELINE

```
┌─────────────────────────────────────────────────┐
│ •                  MAIN WINDOW              • □ │
│ File    Edit    Debug    Tool            Help   │
│ [GO][STOP][STEP][NEXT][STEP Inst][NEXT Inst][STEP CYC] │
│  22a  22b  22c  22d    22e      22f     22g    │
│   ┌─────────────────────────────────────────┐△  │
│   │121  void GETCH( )                       │■  │
│   │122  {                                   │   │
│   │123    while( read_pt == buf_pt ){       │   │
│   │124       CHKGOCAP( );                   │   │
│   │125    }                                 │   │
│   │126    GETDATA = *read_pt;               │   │
│ ○→│127    read_ pt = 0x100                  │   │
│   │128    if(read_pt > (unsigned char *)RSVBUF_ENTADR){│
│   │129      read pt = (unsigned char *)RSVBUF_TOPADR;  │▽
│   └─────────────────────────────────────────┘   │
│   ┌─────────────────────────────────────────┐△  │
│   │> step cycle                             │   │
│   │  1236 cycle                             │   │
│   │> step cycle                             │   │
│   │  stop 127line                           │   │
│   │>                                        │■  │
│   └─────────────────────────────────────────┘▽  │
└─────────────────────────────────────────────────┘
```

SOURCE LEVEL DEBUGGER FOR DEBUGGING SOURCE PROGRAMS

BACKGROUND OF THE INVENTION

1. Field of the Invention

The present invention relates to a source-level debugger for debugging source programs for use with computers adopting a pipeline processing method.

2. Description of the Prior Art

Referring now to FIG. 24, there is illustrated a timing chart showing the operation of a prior art source-level debugger. In system debugging using a source-level debugger, the execution of a source program can be halted (or suspended) by a stop command, a step command, a breakpoint, or the like. Such a halt on the source program's execution suspends the execution of an instruction currently being executed. After that, the contents of a memory, registers, and variables can be displayed. For example, when a breakpoint is set to an instruction "ld24 r5, 2000", which is a load instruction to load the contents of a memory location at address 2000 into a register R5, as shown in FIG. 24, the source-level debugger stops the source program's execution at a clock cycle CC5. As a result, the write stage of the preceding sub instruction and the memory access and write stages of the ld24 instruction remain to be processed when the source program's execution is halted at the clock cycle CC5. The system (or program) execution is thus halted before reading and storing the contents of the memory location at address 200 in the register R5. Accordingly, in the case of microprocessors having a pipeline structure, data associated with an instruction that remains to be executed completely upon a halt on a source program's execution remains to be stored in the memory and/or registers, and variables in the pipeline.

That is because a halt on the execution of an instruction by the source-level debugger is done at the execution stage of the instruction in the pipeline processing. Therefore, when the source-level debugger halts a source-program's execution at a breakpoint placed at an instruction such as a store or load instruction, the data write stage (or write backstage) to write data into either a destination memory location or a destination register and so on is not executed after the execution of the execution stage of the instruction. Accordingly, in the above-mentioned example as shown in FIG. 24, a register window of the source-level debugger shows that the contents of the register R5 are 0. However, if the write stage of the "ld24", instruction is actually executed, it is shown that the contents of the register R5 are FF.

In the case of in-circuit emulators or ICEs, when the source-level debugger reaches an instruction at which the source program's execution is to be halted, it halts the source program's execution by interrupting a microcomputer. When the instruction being executed needs to write data into a memory and/or a register, and a corresponding variable in a microprocessor in which an interruption occurs, the microcomputer can advance to the write back stage by automatically inserting a specific instruction such as a nop instruction into the source program. In the example as shown in FIG. 24, the source-level debugger advances to the clock cycle CC7 and then retrieves the contents of the register R5. As a result, the source-level debugger can display the contents of the memory and/or registers, and variables, which have been updated after the completion of the instruction at which the source program's was halted. However, since ICEs advance the clock cycle by automatically inserting a specific instruction such as a nop instruction into the source program, as mentioned above, it cannot halt the execution of the source program while holding the contents (or internal state) of the pipeline. In the example as shown in FIG. 24, the source-level debugger does not execute the next xor instruction placed just behind the ld24 instruction when it halts the execution of the source program at the ld24 instruction, thus corrupting the contents of the pipeline.

Since the contents of the pipeline differ from its original contents when DMA transfer is carried out during the execution of the write back stage, in real systems, the prior art source-level debugger cannot debug the source program while making the source program run in the same way that it runs on real systems. On the other hand, instruction set simulators cannot simulate the pipeline processing because a source program is executed in units of an assembly-level instruction.

On the other hand, although cycle (or clock)-based simulators can halt a source program's execution while holding the contents of the pipeline, as previously mentioned, the contents of the memory and so on remain to be processed in the pipeline. Thus the source-level debugger cannot display the contents of the pipeline, i.e., the data that remains to be processed in the pipeline.

A problem with a prior art source-level debugger constructed as above is that when it halts or terminates a source program's execution, it cannot display the internal state of the pipeline, e.g., data that remains to be processed in the pipeline. Accordingly, users, such as program developers, cannot recognize the contents of the pipeline, which must be displayed if an instruction that has been halted is executed completely, and therefore cannot grasp operating conditions of real systems.

Another problem with a prior art source-level debugger is that it does not have a user interface to allow users to determine whether the contents of a cache memory in a microprocessor match the contents of part of a memory that have been taken in by the cache memory.

A further problem with a prior art source-level debugger is that although it can debug a source program while executing the source program step by step in units of one instruction by issuing a step execution command, it cannot set a breakpoint for specifying a clock cycle at which the execution of a source program is to be halted and execute the source program step by step in units of one clock cycle, and therefore it cannot debug a corresponding real system at a clock cycle level.

SUMMARY OF THE INVENTION

The present invention is made to overcome the above problems. It is therefore an object of the present invention to provide a source-level debugger capable of, when halting (or suspending) or terminating a source program's execution, showing the internal state of the pipeline.

It is another object of the present invention to provide a source-level debugger capable of allowing users to determine whether the contents of a cache memory in a microprocessor match the contents of part of a memory that have been taken in by the cache memory.

It is a further object of the present invention to provide a source-level debugger capable of debugging a source program at a clock cycle level by executing the source program step by step in units of one clock cycle.

In accordance with one aspect of the present invention, there is provided a source-level debugger for debugging a source program for computers using a pipeline control method. The debugger comprises: a) a not-yet-processed instruction analyzing unit for analyzing each of instructions including not-yet-processed stages in a pipeline when execution of a source program is halted or terminated, and for acquiring information on an internal state of the pipeline and b) a displaying unit for displaying the information on the internal state of the pipeline acquired by the not-yet-processed instruction analyzing unit in a predetermined display form.

In accordance with a preferred embodiment of the present invention, if data, which is associated with each of the instructions, remains to be processed in the pipeline when the execution of the source program is halted or terminated, the not-yet-processed instruction analyzing unit identifies at least one of a destination memory location and a destination register and a corresponding variable therein, into which the data that remains to be processed in the pipeline is to be written, and then furnishes the identification result as the information on the internal state of the pipeline to the displaying unit. Further, the displaying unit displays current data stored in at least one of the identified memory location and the identified register and the corresponding variable therein, i.e., data currently stored in them when the execution of the source program is halted or terminated, in the predetermined display form so that a distinction is made between the data stored in at least one of the identified memory location and the identified register and the corresponding variable and other data stored in other memory locations or variables.

Preferably, the displaying unit displays the current data stored in both either the identified memory location or the identified register and the corresponding variable in a color or font different from that in which other data are displayed.

Preferably, the displaying unit blinks or sets a specific character attribute to the current data stored in at least one of the identified memory location and the identified register and the corresponding variable therein so that a distinction is made between the data stored in at least one of the identified memory location or the identified register and the corresponding variable and other data stored therein.

Preferably, the not-yet-processed instruction analyzing unit makes a predetermined sound if data remains to be processed in the pipeline when the execution of the source program is halted or terminated.

In accordance with another preferred embodiment of the present invention, if data, which is associated with each of the instructions, remains to be processed in the pipeline when the execution of the source program is halted or terminated, the not-yet-processed instruction analyzing unit retrieves the data directly from either a memory location or a register, which is a source of the data, and then furnishes the data as the information on the internal state of the pipeline to the displaying unit. Further, the displaying unit displays the data that is to be written into at least one of a destination memory location and a destination register and a corresponding variable therein, which are identified by the not-yet-processed instruction analyzing unit, in the predetermined display form so that a distinction is made between the data and other data stored therein.

Preferably, the displaying unit displays the data that is to be written into at least one of the destination memory location and the destination register and the corresponding variable therein in a color or font different from that in which other data are displayed.

Preferably, the displaying unit blinks or sets a specific character attribute to the data that is to be written into at least one of the destination memory location and the destination register and the corresponding variable therein so that a distinction is made between the data and other data stored therein.

Preferably, the displaying unit also displays current data stored in at least one of the destination memory location and the destination register and the corresponding variable therein, which are identified by the not-yet-processed instruction analyzing unit, i.e., data currently stored in them when the execution of the source program is halted or terminated, as well as the data that is to be written into at least one of the destination memory location and the destination register and the corresponding variable therein.

In accordance with another aspect of the present invention, there is provided a source-level debugger for debugging a source program for computers using a pipeline control method. The debugger comprises a) a not-yet-processed instruction analyzing unit for analyzing an instruction including not-yet-processed stages in a pipeline when execution of a source program is halted or terminated, and for determining whether the instruction has made data remain to be processed in the pipeline and b) a displaying unit for displaying an instruction that has been determined, as making data remain to be processed, by the not-yet-processed instruction analyzing unit, in a predetermined display form so that a distinction is made between the instruction and other instructions.

Preferably, the displaying unit blinks or sets a specific character attribute to the instruction that has been determined, as making data remain to be processed, by the not-yet-processed instruction analyzing unit, so that a distinction is made between the instruction and other instructions.

Preferably, the not-yet-processed instruction analyzing unit makes a predetermined sound if it determines that the instruction has made data remain to be processed in the pipeline.

In accordance with a further aspect of the present invention, there is provided a source-level debugger for debugging a source program for computers using a pipeline control method. The debugger comprises a) a cache contents checking unit for determining whether the contents of a cache memory that has taken in the contents of part of a memory match the contents of the part of the memory when execution of a source program is halted or terminated and b) a displaying unit for displaying the contents of the memory so that a distinction is made between data that does not match corresponding data stored in the cache memory and data that matches corresponding data stored in the cache memory.

Preferably, the display unit displays the data that does not match corresponding data stored in the cache memory in a color or font different from that in which the data that matches corresponding data stored in the cache memory.

Preferably, the displaying unit blinks or sets a specific character attribute to the data that does not match corresponding data stored in the cache memory so that a distinction is made between data that does not match corresponding data stored in the cache memory and data that matches corresponding data stored in the cache memory.

Preferably, the display unit also displays corresponding data stored in the cache memory for at least the data stored in the memory which does not match the corresponding data stored in the cache memory.

In accordance with another aspect of the present invention, there is provided a source-level debugger for debugging a source program for computers using a pipeline control method. The debugger comprises a) a cycle step-by-step execution unit for executing the source program step by step in units of one cycle (or clock) and b) a displaying unit for producing a predetermined screen display to allow users to start the cycle step-by-step execution unit in an interactive manner.

Preferably, the display unit produces a screen display including at least one of a button, a pull-down menu, a pop-up menu, and a window for allowing users to enter commands, which are used for starting the cycle step-by-step execution unit.

Preferably, the source-level debugger further comprises a halt condition setting unit for allowing users to set a breakpoint defined in units of one cycle to halt execution of a source program at the set breakpoint by at least either one of a relative number of cycles, which is obtained by starting counting the number of cycles at 0 every time the execution of the source program is halted, and an absolute number of cycles, which is obtained by starting counting the number of cycles when the execution of the source program is started.

Further objects and advantages of the present invention will be apparent from the following description of the preferred embodiments of the invention as illustrated in the accompanying drawings.

BRIEF DESCRIPTION OF THE DRAWINGS

FIG. 2 is a flow diagram showing the operation of the source-level debugger according to the first embodiment of the present invention;

FIG. 3 (a) is a view showing an example of a memory window displayed by the source-level debugger according to the first embodiment of the present invention;

FIG. 3(b) is a view showing an example of a register window displayed by the source-level debugger according to the first embodiment of the present invention;

FIG. 3(c) is a view showing an example of a variable window displayed by the source-level debugger according to the first embodiment of the present invention;

FIG. 4(a) is a view showing an example of the memory window displayed by a source-level debugger according to a variant of the first embodiment of the present invention;

FIG. 4(b) is a view showing an example of the register window displayed by the source-level debugger according to the variant of the first embodiment of the present invention;

FIG. 4(c) is a view showing an example of the variable window displayed by the source-level debugger according to the variant of the first embodiment of the present invention;

FIG. 5(a) is a view showing an example of the memory window displayed by a source-level debugger according to another variant of the first embodiment of the present invention;

FIG. 5(b) is a view showing an example of the register window displayed by the source-level debugger according to the other variant of the first embodiment of the present invention;

FIG. 5(c) is a view showing an example of the variable window displayed by the source-level debugger according to the other variant of the first embodiment of the present invention;

FIG. 6(a) is a view showing an example of the memory window displayed by a source-level debugger according to a second embodiment of the present invention;

FIG. 6(b) is a view showing an example of the register window displayed by the source-level debugger according to the second embodiment of the present invention;

FIG. 6(c) is a view showing an example of the variable window displayed by the source-level debugger according to the second embodiment of the present invention;

FIG. 7(a) is a view showing an example of the memory window displayed by a source-level debugger according to a variant of the second embodiment of the present invention;

FIG. 7(b) is a view showing an example of the register window displayed by the source-level debugger according to the variant of the second embodiment of the present invention;

FIG. 7(c) is a view showing an example of the variable window displayed by the source-level debugger according to the variant of the second embodiment of the present invention;

FIG. 10(a) is a view showing an example of the memory window displayed by the source-level debugger according to the third embodiment of the present invention;

FIG. 10(b) is a view showing another example of the memory window displayed by the source-level debugger according to the third embodiment of the present invention;

FIG. 11(a) is a view showing an example of the memory window displayed by a source-level debugger according to a variant of the third embodiment of the present invention;

FIG. 11(b) is a view showing another example of the memory window displayed by the source-level debugger according to the variant of the third embodiment of the present invention;

FIGS. 16(a) and 16(b) are views each showing an example of a screen display produced by the source-level debugger according to the fourth embodiment of the present invention;

FIGS. 23(a) and 23(b) are views each showing an example of a screen display produced by the source-level debugger according to the fifth embodiment of the present invention.

DETAILED DESCRIPTION OF THE PREFERRED EMBODIMENTS

First Embodiment

Figure 1:
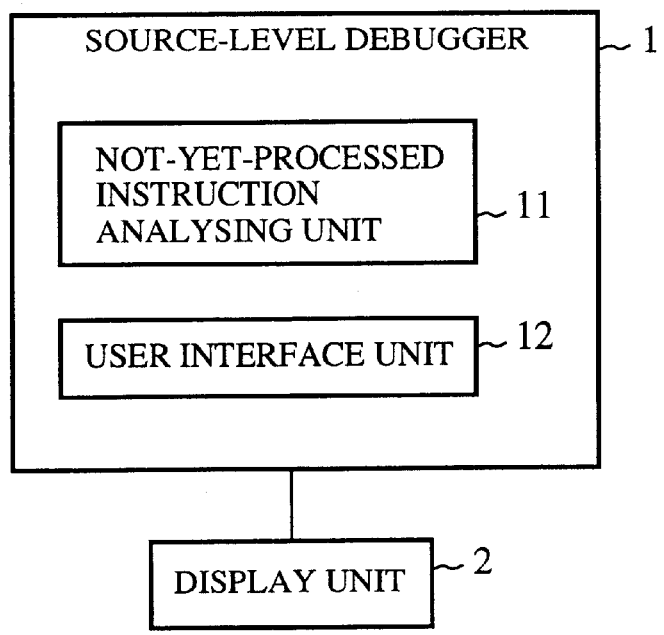
FIG. 1 is a block diagram showing the structure of a source-level debugger according to a first embodiment of the present invention.

Referring next to FIG. 1, there is illustrated a block diagram showing the structure of a source-level debugger according to a first embodiment of the present invention. In the figure, reference numeral 1 denotes a source-level debugger for debugging a source program for computers using a pipeline control method. Numeral 11 denotes a not-yet-processed instruction analyzing unit for analyzing instructions, including not-yet-processed stages (or steps), in a pipeline when current program execution is halted (or suspended) because of either step-by-step execution of the program in units of one instruction or execution of a breakpoint, or terminated, for determining whether data associated with each of the not-yet-processed instructions, which will be referred to as updated data, remains to be processed in the pipeline. The instruction analyzing unit also is for identifying at least one of a destination memory location and a destination register and a corresponding variable therein, into which the updated data that remains to be processed in the pipeline is to be written, and is for sending out the identification result as information on an internal state of the pipeline. Numeral 12 denotes a user interface unit for producing a screen display to show the internal state of the pipeline in a predetermined display form, based on the information on the internal state of the pipeline from the not-yet-processed instruction analyzing unit 11, so as to inform a user of whether or not there is updated data left in the pipeline, which is to be written into at least one of the identified memory location and the identified register and the corresponding variable therein. Numeral 2 denotes a display unit for displaying the screen display produced by the user interface unit 12 on the screen thereof.

Referring next to FIG. 2, there is illustrated a flow diagram showing the operation of the source-level debugger according to the first embodiment of the present invention. FIGS. 3(a) to 3(c) show examples of a memory window, a register window, and a variable window generated by the user interface unit 12 of the source-level debugger of the first embodiment, respectively.

Figure 24:
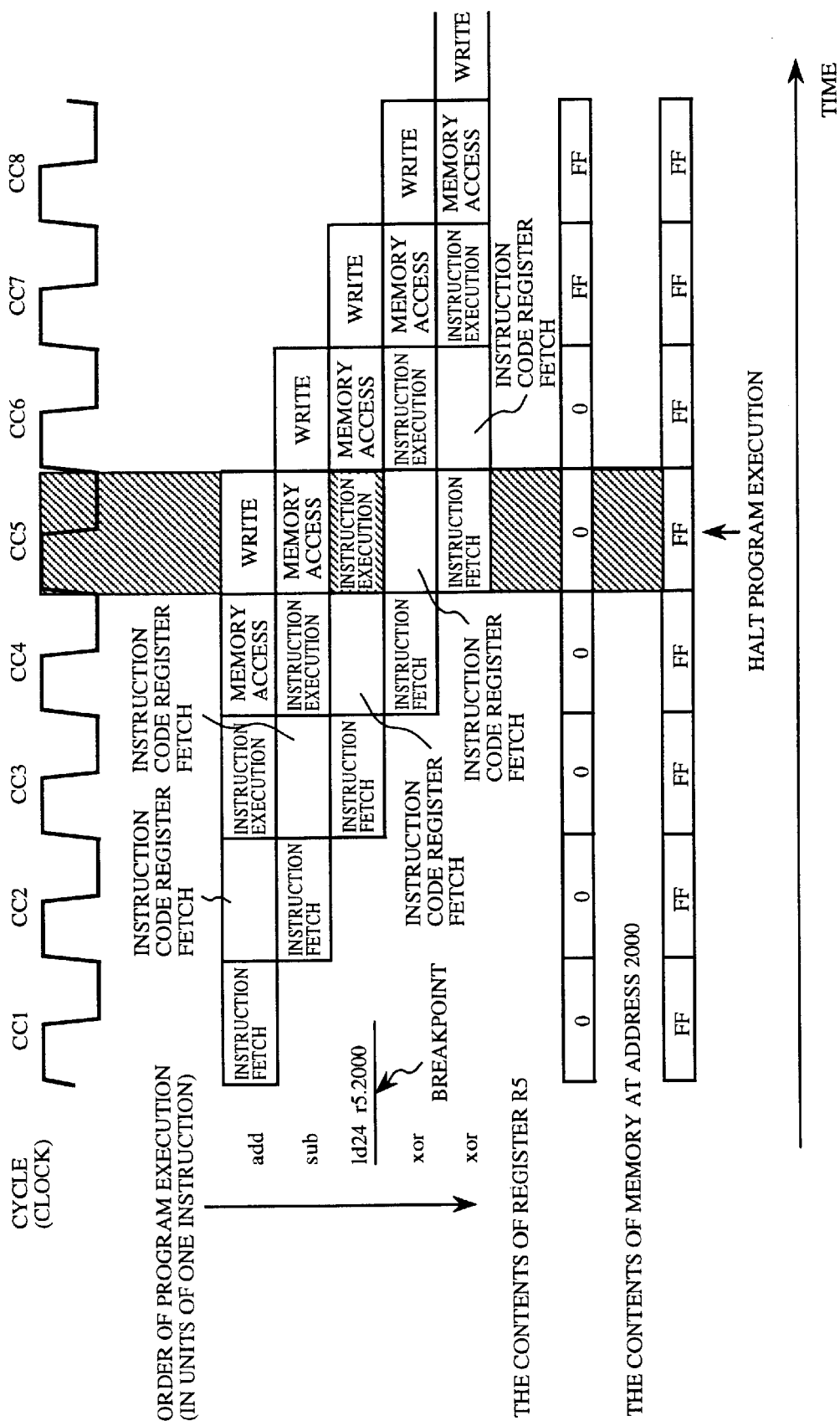
FIG. 24 is a timing chart for showing a relationship among instructions executed in a pipeline, the contents of a register, and the contents of a memory location.

The description will be directed to the case where a sequence of instructions as shown in FIG. 24 are executed when a breakpoint is placed at "ld 24 r5, 2000" (a load instruction to load the contents of a memory at address 2000 into a register R5). In this example, the source-level debugger 1 halts the source program's execution at the clock cycle CC5 at which the execution stage of the load instruction at the breakpoint is executed. As a result, in the example as shown in FIG. 24, the write stage of the preceding sub instruction and the memory access and write stages of the "ld24" instruction remain to be executed or processed. In other words, the system's (or source program's) execution is halted before the contents of the memory at address 2000 is stored into the read register R5. This is because a halt on the execution of an instruction by the source-level debugger 1 is done at the execution stage of the instruction in the pipeline processing. Therefore, when the source-level debugger 1 halts a source-program's execution at a breakpoint placed at an instruction such as a store or load instruction, the data write stage (or write back stage) to write data into either a destination memory location or a destination register and so on is not executed after the execution of the execution stage of the instruction. Accordingly, in the above-mentioned example as shown in FIG. 24, the contents of the register R5 are 0 at the breakpoint. However, if the write stage of the "ld24" instruction is actually executed, the contents of register R5 must be FF.

The not-yet-processed instruction analyzing unit 11, in step ST21, determines whether there are not-yet-processed stages of instructions, from execution stages to write back stages, left in the pipeline, that is, whether updated data associated with each of the not-yet-processed instructions remains to be processed in the pipeline, when current program execution is halted because of either step-by-step execution of the source program in units of one instruction or execution of a breakpoint, or terminated. If updated data remains to be processed in the pipeline, the not-yet-processed instruction analyzing unit 11, in step ST22, can keep the internal state of the halted pipeline by stopping the cycle (or clock) that is an execution event of the simulator. The not-yet-processed instruction analyzing unit 11 further, in step ST23, analyzes each of the instructions including the not-yet-processed stages so as to determine whether each of the not-yet-processed instructions is a load instruction, a store instruction, or another instruction, and to identify at least one of a destination memory location and a destination register and a corresponding variable therein, into which updated data associated with each of the not-yet-processed instructions, which remains to be processed in the pipeline, is to be written. The not-yet-processed instruction analyzing unit 11 can also determine whether or not each of the instructions is another specific instruction other than load and store instructions. When each of the not-yet-processed instructions is a load instruction, the not-yet-processed instruction analyzing unit 11, in step ST24, retrieves updated data directly from a memory location at an address specified by the load instruction, which is the source of the updated data, and then recognizes that data currently stored in a specified register into which the updated data is to be loaded by the load instruction will be updated (that is, recognizes that the data currently stored in the register is updated if the last stage of the load instruction is executed). On the other hand, when each of the not-yet-processed instructions is a store instruction, the not-yet-processed instruction analyzing unit 11, in step ST25, retrieves updated data directly from a register specified by the store instruction, which is the source of the updated data, and then recognizes that data currently stored in the memory at a specified address into which the updated data is to be stored by the store instruction will be updated. In this way, the not-yet-processed instruction analyzing unit 11 determines whether updated data associated with each of the not-yet-processed instructions remains to be processed in the pipeline, identifies at least one of a destination memory location and a destination register, and a corresponding variable therein, into which the updated data that remains to be processed in the pipeline is to be written, and sends out the identification result as information on the internal state of the pipeline.

The user interface unit 12, in step ST26, produces a register window, as shown in FIG. 3(b), showing that data currently stored in a specified register into which the updated data is to be loaded by the load instruction, based on the information on the internal state of the pipeline from the not-yet-processed instruction analyzing unit 11. The user interface unit 12 then displays the register window on the screen of the display unit 2. In the example shown, the user interface unit 12 blinks the data 300 currently stored in the specified register, which is to be updated by the execution of not-yet-processed stages of the load instruction, so that a distinction is made between the data 300 and other data. The user can recognize that the updated data to be loaded in the specified register remains to be processed in the pipeline at the sight of the blinking value "00", of the data 300 when the source program's execution is halted. The user interface unit 12 can also display the data 300 in a specific color different from that in which other data that are not to be updated are displayed. As an alternative, instead of blinking the data 300 currently stored in the specified register, which is to be updated by the execution of the not-yet-processed stages of the load instruction, the user interface unit 12 can only display the data 300 in a specific color different from that in which other data that are not to be updated are displayed. The user interface unit 12 can also produce a variable window, as shown in FIG. 3 (c), showing a variable whose data 200 currently stored in the specified register is to be updated, as well as the register window, and then display the variable window on the display unit 2. In the variable window, the data to be updated can be displayed in the same form as the data to be updated displayed in the register window as shown in FIG. 3(b).

On the other hand, the user interface unit 12, in step ST27, produces a memory window, as shown in FIG. 3 (a), showing that data currently stored in a memory location at a specified address into which the updated data is to be stored by the store instruction, based on the information on the internal state of the pipeline from the not-yet-processed instruction analyzing unit 11. The user interface unit 12 then displays the memory window on the screen of the display unit 2. In the example shown, the user interface unit 12 blinks the data 100 currently stored in the memory location at the specified address, which is to be updated by the execution of the not-yet-processed stages of the store instruction, so that a distinction is made between the data 100 and other data. The user can recognize that the updated data to be stored in the memory location at the specified address remains to be processed in the pipeline at the sight of the blinking value "00", of the data 100 when the source program's execution is halted. The user interface unit 12 can also display the data 100 in a specific color different from that in which other data that are not to be updated are displayed. As an alternative, instead of blinking the data 100 currently stored in the memory location at the specified address, which is to be updated by the execution of the not-yet-processed stages of the store instruction, the user interface unit 12 can only display the data 100 in a specific color different from that in which other data that are not to be updated are displayed. The user interface unit 12 can also produce a variable window, as shown in FIG. 3(c), showing a variable whose data 200 currently stored in the memory location at the specified address is to be updated, as well as the memory window, and then display the variable window on the display unit 2. In the variable window, the data to be updated can be displayed in the same form as the data to be updated displayed in the memory window as shown in FIG. 3(a).

When two or more updated data that are to be written into destinations, each of which is a memory location or a register, remain to be processed in the pipeline when the source program's execution is halted or terminated, the user interface unit 12 can display a memory window, a register window, and a variable window on the display unit 2, as shown in FIGS. 3(a) to 3(c).

In the example as shown in FIG. 24, since the instruction at which the breakpoint is placed is a load instruction, the not-yet-processed instruction analyzing unit 11, in step ST24, retrieves the updated data directly from the memory location at address 2000 identified by the load instruction "ld24", and then determines that the contents of the register R5 are to be updated. As a result, the user interface unit 12, in step ST26, produces a register window, as shown in FIG. 3(b), showing that data currently stored in the register R5 into which the updated data is to be loaded by the load instruction will be updated, based on the determination result from the not-yet-processed instruction analyzing unit 11. The user interface unit 12 then displays the register window on the display unit 2.

Numerous variants may be made in the exemplary embodiment shown. For example, the not-yet-processed instruction analyzing unit 11 can instruct a sound generating unit not shown to generate a predetermined sound to inform the user that updated data remains to be processed in the pipeline, in addition to displaying data to be updated in a predetermined display form as shown in FIGS. 3(a) to 3(c).

FIGS. 4(a) to 4(c) respectively show a memory window, a register window, and a variable window generated by a user interface unit 12 of a source-level debugger 1 according to a variant of the first embodiment. In the memory window as shown in FIG. 4(a), only data to be updated is underlined so that a distinction is made between the data and other data stored in other memory locations. The data to be updated can alternatively be displayed with a different character attribute being set to the data's letters. In the register window as shown in FIG. 4(b), only data to be updated is displayed in a special way so that the data's letters slope, i.e., in a different font. The data to be updated can alternatively be displayed in another font such as a bold type font. In the variable window as shown in FIG. 4(c), only variable data corresponding to the data displayed in a predetermined display form, as shown in FIG. 4(a) or 4(b), is displayed in a font different to that in which other variable data are displayed. Needless to say, any one of the memory window, the register window, and the variable window can be displayed in any display form as shown in FIG. 4(a), 4(b), or 4(c).

FIGS. 5(a) to 5(c) respectively show a memory window, a register window, and a variable window generated by a user interface unit 12 of a source-level debugger 1 according to another variant of the first embodiment. In the memory window as shown in FIG. 5(a), only the higher-order and lower-order bits in hexadecimal of an address identifying a memory location in which data to be updated is stored are underlined so that a distinction is made between the higher-order and lower-order bits of the address and the higher-order and lower-order bits of other addresses. The higher-order and lower-order bits of the address can alternatively be displayed with a different character attribute being set to the address's letters. In the register window as shown in FIG. 5(b), only data to be updated and the name of the register that stores the data to be updated are displayed in a special way so that the data's letters and the name's letters slope, i.e., in a different font. The data to be updated and the name of the register can alternatively be displayed in another font such as a bold type font. In the variable window as shown in FIG. 5(c), the name of a variable corresponding to the data displayed in a specific display form, as shown in FIG. 5(a) or 5(b), is displayed in a font different to that in which other variables are displayed. Needless to say, any one of the memory window, the register window, and the variable window can be displayed in any display form as shown in FIG. 5(a), 5(b), or 5(c).

Needless to say, any combination of two or more of blinking, a character attribute, a color, a font, and so on can be used for displaying data to be updated so that a distinction is made between the data to be updated and other data. For example, the data to be updated can be blinked and displayed in a specific font different to that in which other data are displayed. Alternatively, the data to be updated can be displayed in a specific color and a specific font, which are respectively different to those in which other data are displayed. In a memory window, in addition to underlining an address identifying a memory location in which data to be updated is stored so that a distinction is made between the address and other addresses, the data to be updated can be displayed using any combination of two or more of blinking, a character attribute, a color, a font, and so on so that a distinction is made between the data to be updated and other data.

As previously mentioned, in accordance with the first embodiment of the present invention, the source-level debugger can analyze instructions, including not-yet-processed stages, in a pipeline when current program execution is halted because of either step-by-step execution of the program in units of an instruction or execution of a breakpoint, or terminated, determine whether data to be updated associated with each of the not-yet-processed instructions remains to be processed in the pipeline, and produces a screen display in a predetermined display form to show whether or not there is updated data associated with each of the not-yet-processed instructions, which is to be written into at least one of an identified memory location and an identified register and a corresponding variable therein, left in the pipeline, based on the determination result. Therefore, the source-level debugger 1 of the first embodiment can inform users of whether or not there is updated data left in the pipeline, thus allowing users to recognize the address of a destination memory location and/or the name of a destination register, into which one or more updated data that remain to be processed in the pipeline is to be written, and the name of a corresponding variable. The first embodiment of the present invention offers an advantage of being able to allow users to grasp the operation of a real system to which the source program to be debugged can be applied.

Second Embodiment

A source-level debugger according to a second embodiment of the present invention can analyze instructions including not-yet-processed stages in a pipeline, and, when updated data associated with each of the not-yet-processed instructions remains to be processed in the pipeline, directly access to either a memory location at a specified address or a specified register for storing the updated data so as to retrieve the updated data. Then the source-level debugger can produce a screen display to display the retrieved updated data in a predetermined display form. While the source-level debugger according to the second embodiment of the present invention has the same structure as the source-level debugger according to the aforementioned first embodiment, the source-level debugger according to the second embodiment differs from that of the first embodiment in that a not-yet-processed instruction analyzing unit 11 of the source-level debugger according to the second embodiment analyzes instructions including not-yet-processed stages in a pipeline, and, when updated data associated with each of the not-yet-processed instructions remains to be processed in the pipeline, directly accesses to either a memory location at a specified address or a specified register for storing the updated data so as to retrieve the updated data, and in that a user interface unit 12 produces a screen display to display the updated data retrieved by the not-yet-processed instruction analyzing unit 11 in a predetermined display form.

In operation, the not-yet-processed instruction analyzing unit 11 analyzes instructions including not-yet-processed stages in a pipeline, and, when updated data associated with each of the not-yet-processed instructions remains to be processed in the pipeline, directly accesses to either a memory location at a specified address or a specified register for storing the updated data so as to retrieve the updated data. The user interface unit 12 produces a screen display to display the updated data retrieved by the not-yet-processed instruction analyzing unit 11 in a predetermined display form on the screen of a display unit 12, as shown in FIGS. 6(a) to 6(c). When the updated data is to be written into a destination memory location at a specified address if the corresponding not-yet-processed instruction is completely executed, only the higher-order and lower-order bits in hexadecimal of the address identifying the destination memory location in which the updated data is to be stored are underlined and the updated data is displayed in a box or cell specified by the address, in a memory window as shown in FIG. 6(a). When the updated data is to be written into a specified register if the corresponding not-yet-processed instruction is completely executed, only the updated data and the name of the register are displayed in a font different from that in which other data and the names of other registers are displayed and the updated data is displayed in the register's box or cell, in a register window as shown in FIG. 6(b). In a variable window as shown in FIG. 6(c), the name of a variable corresponding to the updated data displayed in a specific display form, as shown in FIG. 6(a) or 6(b), is displayed in a color different from that in which other variables are displayed. Needless to say, any one of the memory window, the register window, and the variable window can be displayed in any display form as shown in FIG. 6(a), 6(b), or 6(c). As an alternative, the user interface unit 12 can blink the updated data in the same way as shown in FIG. 3(a).

Needless to say, any combination of two or more of blinking, a character attribute, a color, a font, and so on can be used for displaying updated data so that a distinction is made between the updated data and other data. For example, the updated data can be blinked and displayed in a specific font different to that in which other data are displayed. Alternatively, the updated data can be displayed in a specific color and a specific font, which are respectively different to those in which other data are displayed. In the memory window, in addition to underlining an address identifying a destination memory location in which the updated data is to be stored so that a distinction is made between the address and other addresses, the updated data can be displayed using any combination of two or more of blinking, a character attribute, a color, a font, and so on so that a distinction is made between the updated data and other data.

Numerous variants may be made in the exemplary embodiment shown. For example, the not-yet-processed instruction analyzing unit 11 can instruct a sound generating unit not shown to generate a predetermined sound to inform users that updated data remains to be processed in the pipeline, in addition to allowing the user interface unit 12 to display the updated data in a predetermined display form as shown in FIGS. 6(a) to 6(c).

In a variant, the user interface unit 12 can display updated data retrieved by the not-yet-processed instruction analyzing unit 11 as well as current data (i.e., data to be updated) stored in the memory and/or registers, and set to variables when the source program's execution is halted, on the display unit 2, as shown in FIGS. 7(a) to 7(c). When the updated data is to be written into a destination memory location at a specified address if the corresponding not-yet-processed instruction is completely executed, the updated data, as well as the current data, is displayed in a cell specified by the address in the memory window, as shown in FIG. 7(a). The updated data can be shown inside a parenthesis. When the updated data is to be written into a specified register if the corresponding not-yet-processed instruction is completely executed, the updated data is displayed to the right of the current data in the register's cell in the register window, those data being separated by an arrow, as shown in FIG. 7(b). In the variable window as shown in FIG. 7(c), a table showing the updated data that remains to be processed in the pipeline, as well as a table showing the current data set to the variables, as shown in FIG. 7(a) or 7(b), is displayed. Needless to say, any one of the memory window, the register window, and the variable window can be displayed in any display form as shown in FIG. 7(a), 7(b), or 7(c).

As previously mentioned, in accordance with the second embodiment of the present invention, the source-level debugger can analyze instructions, including not-yet-processed stages, in a pipeline when current program execution is halted because of either step-by-step execution of the program in units of an instruction or execution of a breakpoint, or terminated, determine whether updated data associated with each of the not-yet-processed instructions remains to be processed in the pipeline, produces a screen display to show the updated data associated with each of the not-yet-processed instructions in a specific display form, based on the determination result, when the updated data that is to be written into at least one of a specified memory location and a specified register and a corresponding variable remains to be processed in the pipeline. Therefore, the source-level debugger 1 of the second embodiment can inform users of whether or not there is updated data left in the pipeline, thus allowing users to recognize the address of a destination memory location and/or the name of a destination register, into which one or more updated data that remain to be processed in the pipeline is to be written, and the name of a corresponding variable. The second embodiment of the present invention offers an advantage of being able to allow users to grasp the operation of a real system to which the source program to be debugged can be applied. The second embodiment of the present invention also offers an advantage of being able to allow users to recognize one or more updated data that remain to be processed in the pipeline and that are to be written into both a specified memory location and/or a specified register and a corresponding variable.

In addition, according to the above-mentioned variant as shown in FIGS. 7(a) to 7(c), the updated data can be displayed in comparison with the data to be updated. The variant thus offers an advantage of being able to recognize the updated data that remains to be processed in the pipeline and that is to be written into a specified memory location or register and a corresponding variable as well as the data currently stored in the memory and/or registers, and variables.

Third Embodiment

Figure 8:
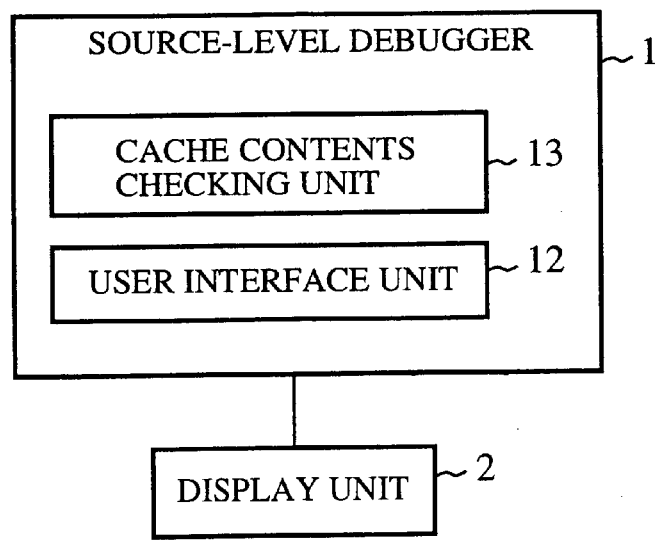
FIG. 8 is a block diagram showing the structure of a source-level debugger according to a third embodiment of the present invention.

Referring next to FIG. 8, there is illustrated a block diagram showing the structure of a source-level debugger according to a third embodiment of the present invention. In the figure, the same reference numerals as shown in FIG. 1 designate the same components as of the source-level debugger according to the aforementioned first embodiment, and therefore the description of the components will be omitted hereinafter. In FIG. 8, reference numeral 13 denotes a cache contents checking unit for comparing the contents of a cache memory that has taken in the contents of part of a memory with the contents of the part of the memory, and for, when there is not a match between them, informing a user interface unit 12 that there is not a match between them.

Figure 9:
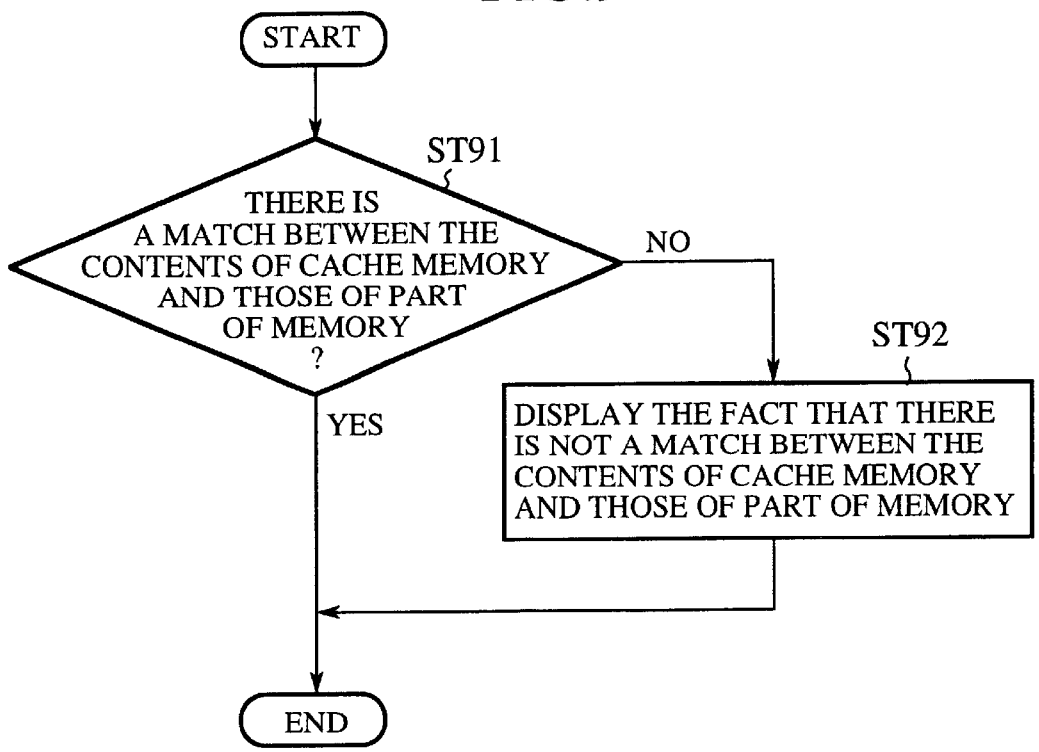
FIG. 9 is a flow diagram showing the operation of the source-level debugger according to the third embodiment of the present invention.

Referring next to FIG. 9, there is illustrated a flow diagram showing the operation of the source-level debugger according to the third embodiment of the present invention. When current program execution is halted because of either step-by-step execution of the program in units of one instruction or execution of a breakpoint, or terminated, the cache contents checking unit 13, in step ST91, compares the contents of the cache memory that has taken in the contents of part of the memory with the contents of the part of the memory, and determines whether or not there is a match between them. The cache contents checking unit 13 then sends out the determination result to the user interface unit 12.

When the contents of the cache memory do not match the contents of the part of the memory, the user interface unit 12, in step ST92, produces a memory window, as shown in FIG. 10(a), showing the contents of the memory, based on the determination result from the cache contents checking unit 13, and then displays the memory window on a display unit 2. In the example as shown in FIG. 10(a), the data that has been taken in by the cache memory is marked with the an asterisk (*), and the data that does not match corresponding data stored in the cache memory is displayed in a different color. FIG. 10(b) shows another example of the memory window. In this example, cells in which data that has been taken in by the cache memory are placed are displayed on a gray background, and the data that does not match corresponding data stored in the cache memory is marked with the an asterisk (*).

Numerous variants may be made in the exemplary embodiment shown. For example, the cache contents checking unit 13 can retrieve the data stored in the cache memory, and the user interface unit 12 can display the contents of the cache memory, as well as the current data stored in the memory, on the display unit 12, as shown in FIG. 11(a). In the example of FIG. 11(a), each piece of the data stored in the cache memory is shown inside a parenthesis. As an alternative, the cache contents checking unit 13 retrieves the data stored in the cache memory when the contents of the cache memory do not match those of the part of Jill the memory, and the user interface unit 12 can display the contents of the cache memory that do not match those of the part of the memory, as well as the current data stored in the memory, on the display unit 12, as shown in FIG. 11(b). In the example of FIG. 11(b), each piece of the data stored in the cache memory that do not match those of the part of the memory is shown inside a parenthesis.

As previously mentioned, in accordance with the third embodiment of the present invention, the source-level debugger can compare the contents of the cache memory that has taken in the contents of part of the memory with the contents of the part of the memory, and informs the user interface unit 12 of whether or not there is a match between them, when current program execution is halted because of either step-by-step execution of the program in units of one instruction or execution of a breakpoint, or terminated.

Further, when the contents of the cache memory do not match the contents of the part of the memory, the user interface unit 12 produces a memory window showing the contents of the memory so as to inform users of whether or not there is a match between the contents of the cache memory and the contents of the part of the memory. Therefore, the source-level debugger 1 of the third embodiment can allow the user to recognize whether or not there is a match between the contents of the cache memory and the contents of the part of the memory, as well as the contents of the part of the memory that has been taken in by the cache memory, and the addresses of the corresponding memory locations. The third embodiment of the present invention thus offers an advantage of being able to allow users to grasp the operation of a real system to which the source program to be debugged can be applied. The third embodiment of the present invention also offers an advantage of being able to allow users to also recognize the contents of the cache memory by displaying the contents of the cache memory on the display unit.

Fourth Embodiment

Figure 12:
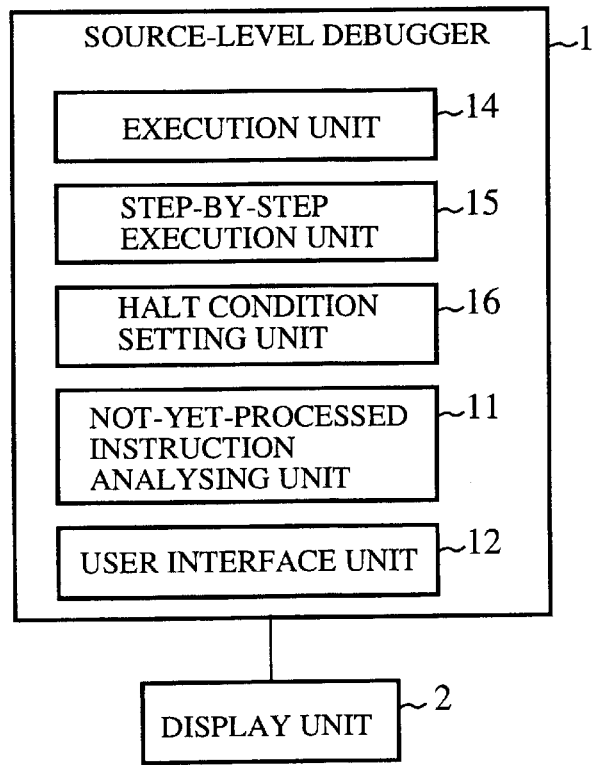
FIG. 12 is a block diagram showing the structure of a source-level debugger according to a fourth embodiment of the present invention.

Referring next to FIG. 12, there is illustrated a block diagram showing the structure of a source-level debugger according to a fourth embodiment of the present invention. In the figure, the same reference numerals as shown in FIG. 1 designate the same components as of the source-level debugger according to the aforementioned first embodiment, or like components, and therefore the description of the components will be omitted hereinafter. In FIG. 12, reference numeral 14 denotes an execution unit for executing a source program to be debugged, numeral 15 denotes a step-by-step execution unit for executing a source program to be debugged step by step, and numeral 16 denotes a halt condition setting unit for setting a halt condition to halt a source program's execution, such as a breakpoint where a source program's execution is halted. A not-yet-processed instruction analyzing unit 11 of the source-level debugger according to the fourth embodiment analyzes an instruction (or statement), including not-yet-processed stages, in a pipeline when current program execution is halted because of either step-by-step execution of the program in units of one instruction or execution of a breakpoint, or terminated, and then determines whether the not-yet-processed instruction has made data remain to be processed in the pipeline, that is, whether the not-yet-processed instruction has finished writing data into at least one of a destination memory location and a destination register, and a corresponding variable. A user interface unit 12 produces a screen display on which various types of menus, a source window, a command window, and so on can be shown, so as to allow users such as program developers to make the source-level debugger execute a source program, or execute the source program step by step, in an interactive manner.

Figures 13, 14:
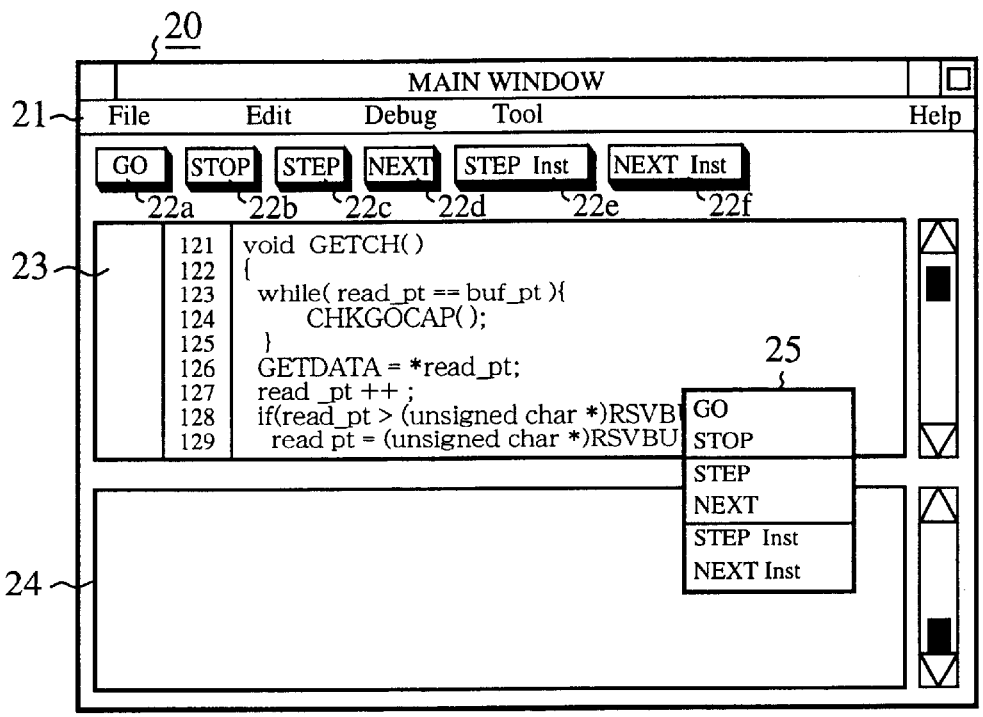
FIG. 13 is a view showing a screen display produced by the source-level debugger according to the fourth embodiment of the present invention.
FIG. 14 is a view showing a case where a pull-down menu is further displayed on the screen display of FIG. 13.

Referring next to FIG. 13, there is illustrated a view showing an example of a screen display produced by the user interface unit 12. In the figure, reference numeral 20 denotes a main window on the screen display produced by the user interface unit 12, numeral 21 denotes a menu bar, numerals 22a to 22f denote a GO button, a STOP button, a STEP button, a NEXT button, a STEP Inst button, and a Next Inst button, respectively, numeral 23 denotes a source window for displaying a source program, numeral 24 denotes a command window for receiving a command typed in by users, for displaying the command, and for displaying messages from the source-level debugger 1, and numeral 25 denotes a pop-up menu for displaying a list of menu items (or commands) having the same names as the buttons 22a to 22f. Referring next to FIG. 14, there is illustrated a view showing an example of a screen display when a user selects Debug in the menu bar 21 by clicking on the menu item with a mouse for example. In the figure, reference numeral 26 denotes a pull-down menu for displaying a list of menu items (or commands) having the same names as the buttons 22a to 22f.

When a user enters a GO command by choosing the GO button 22a using a mouse or the like, choosing the GO menu item in the pop-up menu 25 or the pull-down menu 26, or typing in "go" in the command window 24, the source-level debugger 1 starts executing a source program loaded thereinto. When the user further enters a STOP command by choosing the STOP button 22b using a mouse or the like, choosing the STOP menu item in the pop-up menu 25 or the pull-down menu 26, or typing in "stop" in the command window 24, the source-level debugger 1 stops the execution of the source program.

When a STEP or STEP Inst command is issued, the source-level debugger 1 halts the execution of a source program loaded thereinto after it has executed only one instruction of the source program. A difference between the STEP command and the STEP Inst command is in that every instruction executed step by step is an instruction written in a high-level language such as C language in the case of the STEP command, and every instruction executed step by step is an instruction written in an assembly language (i.e., a CPU instruction) in the case of the STEP Inst command. Although NEXT and NEXT Inst commands are basically the same as the STEP and STEP Inst commands, respectively, they differ from the STEP and STEP Inst commands in that they assume that every function included in a source program is an instruction. If the source-level debugger advances to a function when the STEP or STEP Inst command is executed, it stops the execution of the source program at the first instruction defined within the function. In contrast, if the source-level debugger advances to a function when the NEXT or NEXT Inst command is executed, it executes the function by assuming that the function is an instruction, and then stops the execution of the source program at an instruction located just behind the function. In other words, when the NEXT or NEXT Inst command is executed, the source-level debugger 1 does not stop the execution of the source program at an instruction defined within any function.

Figure 15:
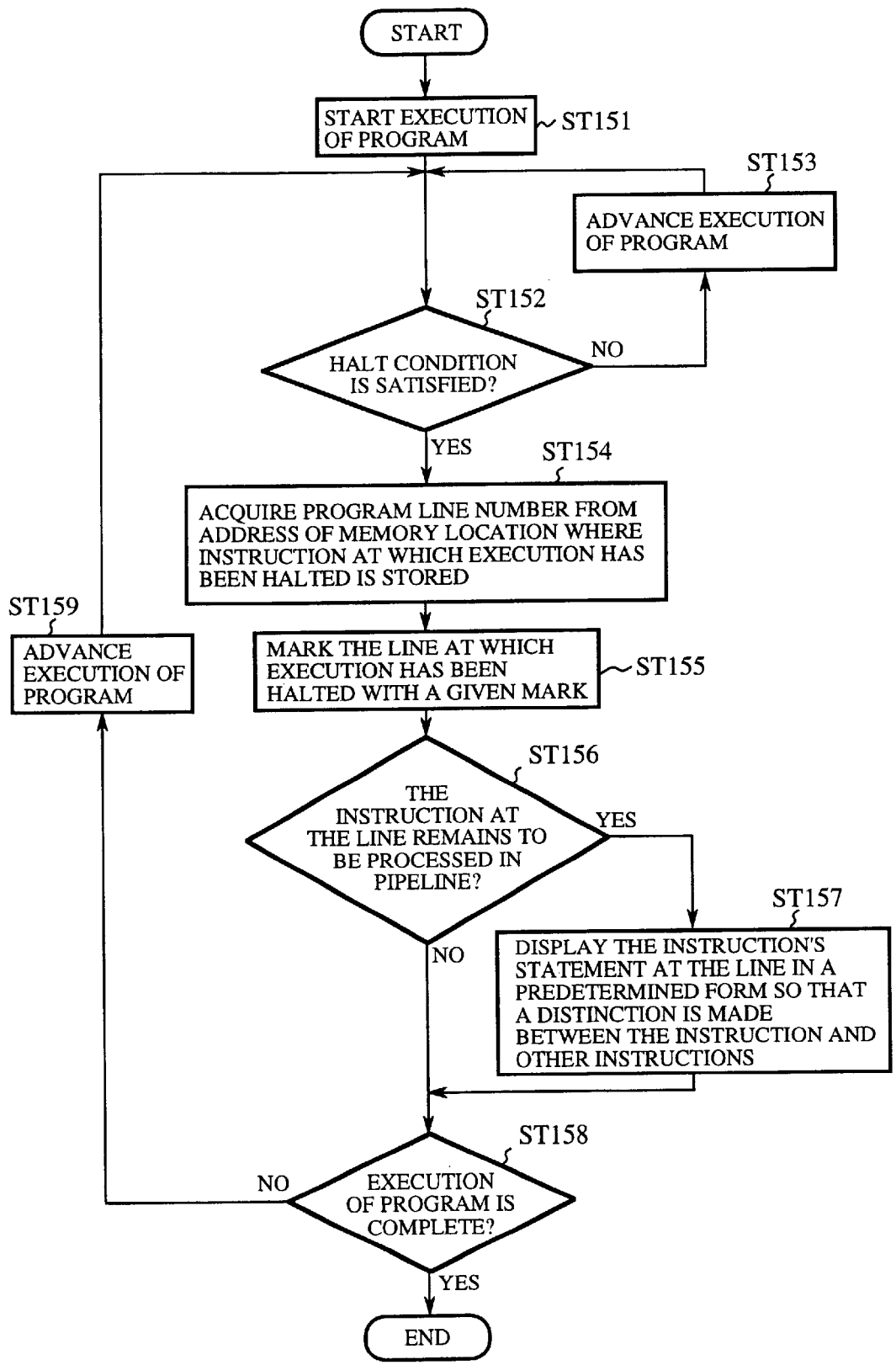
FIG. 15 is a flow diagram showing the operation of the source-level debugger according to the fourth embodiment of the present invention.

Referring next to FIG. 15, there is illustrated a flow diagram showing procedures of executing a source program by the source-level debugger 1 of the fourth embodiment. As shown in FIG. 15, when the GO command is issued in step ST151, the execution unit 14 of the source-level debugger 1 starts executing a source program loaded thereinto. The source-level debugger 1 executes the source program step by step. After that, the execution unit 14 determines whether a source program counter (not shown) has a value that satisfies a halt condition defined by the halt condition setting unit 16 in advance. Unless the value of the source program counter satisfies the halt condition, the source-level debugger 1 advances to step ST153 in which it advances the execution of the source program by one step and then returns to step ST152. In performing step ST152, if the value of the source program counter satisfies the halt condition, the execution unit 14, in step ST154, halts the execution of the source program and acquires a corresponding line number (or statement number) of the halted source program from the address of a memory location where the instruction or statement at which the execution of the source program has been halted is stored. The execution unit 14 then, in step ST155, displays a given mark "→" 27b at the corresponding line of the halted source program.

The not-yet-processed instruction analyzing unit 11, in step ST156, determines whether the instruction, at which the execution of the source program has been halted, has not finished writing data into both either a destination memory location or a destination register, and a corresponding variable (or whether there is a not-yet-processed instruction left in the pipeline), that is, whether the instruction has made updated data remain to be processed in the pipeline. When the instruction, at which the execution of the source program has been halted, has not finished writing data into both either a destination memory location or a destination register, and a corresponding variable, the not-yet-processed instruction analyzing unit 11, in step ST157, informs the user interface unit 12 of the fact that the instruction or statement has not finished writing data. The user interface unit 12 then sets a specific character attribute to the letters of the statement to display the statement, at which the execution of the source program has been halted, in the source window 23 so that a distinction is made between the instruction and other instructions. For example, the user interface unit 12 draws a box around the statement in the source window 23, as shown in FIG. 16(a). As an alternative, the user interface unit 12 displays the instruction in a color different from that in which other instructions are displayed in the source window 23, as shown in FIG. 16(b). In the example shown, when the user sets a breakpoint to an instruction "read_pt=0×100" at the line No. 127 of the source program by entering "breakpoint 127" in the command window 24, and then enters "go"g to make the source-level debugger execute the source program, the source-level debugger halts the execution of the source program at the line No. 127 and shows that the instruction at the line No. 127 has not finished writing data into both either a destination memory location or a destination register, and a corresponding variable. That is, 0×100 has not been written into the variable "read—apt" in the above example as shown in FIGS. 16(a) or 16(b). A mark "○" 27a, as shown in FIGS. 16(a) and 16(b), shows the breakpoint that the user has set in advance.

As an alternative, the source-level debugger 1 can blink or display the instruction, at which the execution of the source program has been halted, either in a font different from that in which other instructions are displayed, or using any combination of two or more of blinking, a character attribute, a color, a font, and so on. The not-yet-processed instruction analyzing unit 11 can instruct a sound generating unit not shown to generate a predetermined sound to inform users that the instruction, at which the execution of the source program has been halted, has not finished writing data into both either a destination memory location or a destination register, and a corresponding variable, in addition to displaying the instruction in a predetermined display form in the source window 23.

As previously mentioned, in accordance with the fourth embodiment of the present invention, the source-level debugger 1 can display an instruction that has not finished processing when a source program's execution is halted or terminated so that a distinction is made between the instruction and other instructions, thus enabling users to easily recognize the instruction that has not finished processing completely.

Fifth Embodiment

Figure 17:
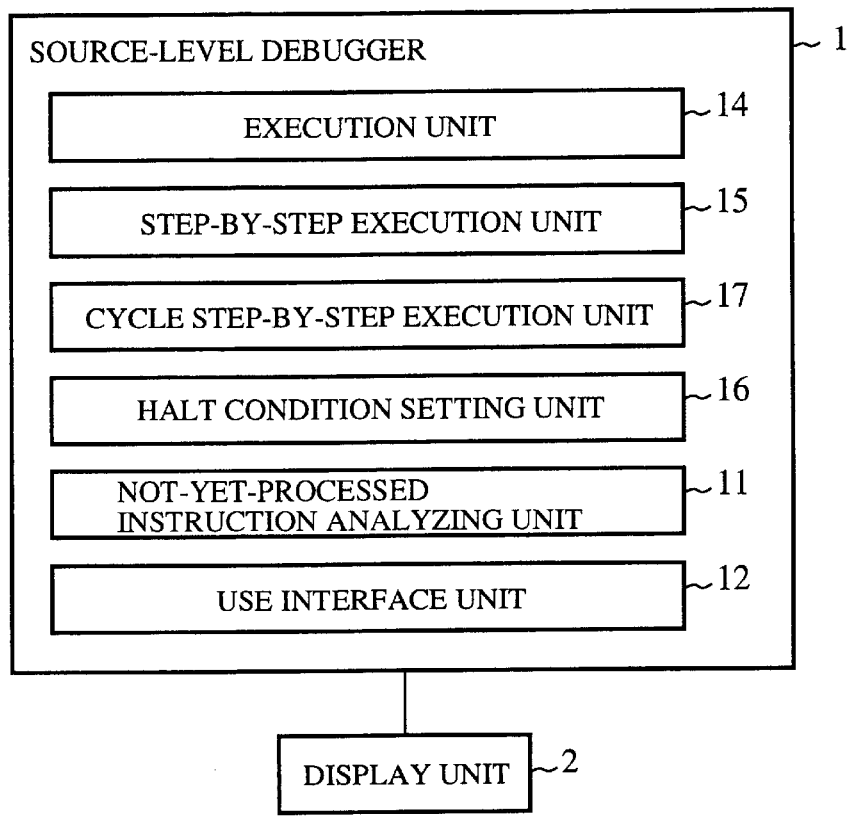
FIG. 17 is a block diagram showing the structure of a source-level debugger according to a fifth embodiment of the present invention.

Referring next to FIG. 17, there is illustrated a block diagram showing the structure of a source-level debugger according to a fifth embodiment of the present invention. In the figure, the same reference numerals as shown in FIG. 12 designate the same components as of the source-level debugger according to the aforementioned fourth embodiment, or like components, and therefore the description of the components will be omitted hereinafter. In FIG. 17, reference numeral 17 denotes a cycle step-by-step execution unit for executing a source program to be debugged step by step in units of a cycle (or clock). A halt condition setting unit 16 of the source-level debugger 1 according to the fifth embodiment can set a halt condition to halt a source program's execution. The halt condition setting unit 16 can set a breakpoint (or a halt address) specifying a location in a source program where the source program's execution is to be halted. The halt condition setting unit 16 can also set a breakpoint (or a halt cycle) specifying a clock cycle at which the source program's execution is halted. A user interface unit 12 produces a screen display on which various types of menus, a source window, a command window, and so on can be shown, so as to allow users such as program developers to make the source-level debugger execute a source program, execute the source program step by step, or execute the source program step by step in units of a cycle in an interactive manner.

Figure 18:
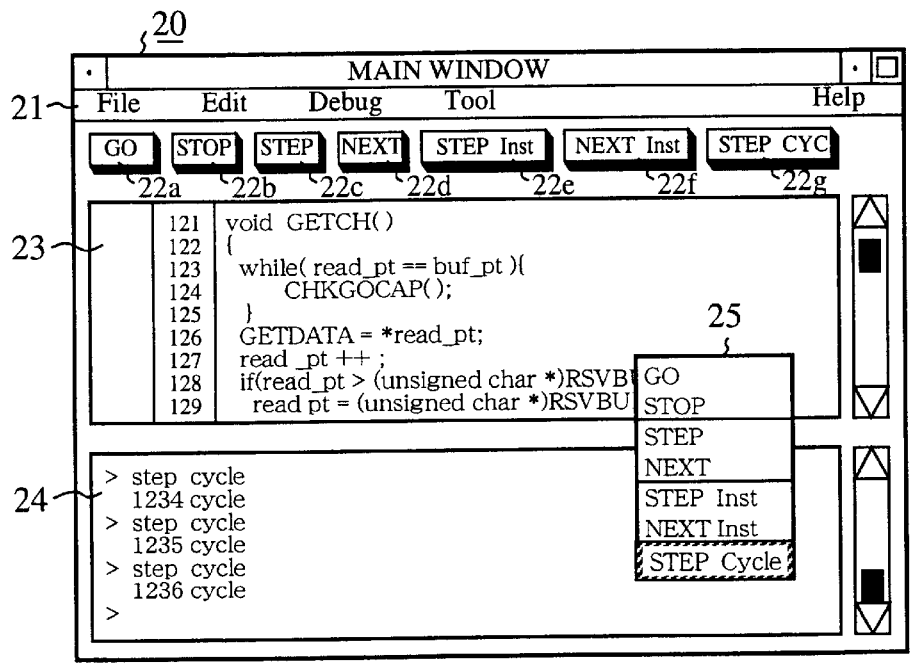
FIG. 18 is a view showing a screen display produced by the source-level debugger according to the fifth embodiment of the present invention.
Figure 19:
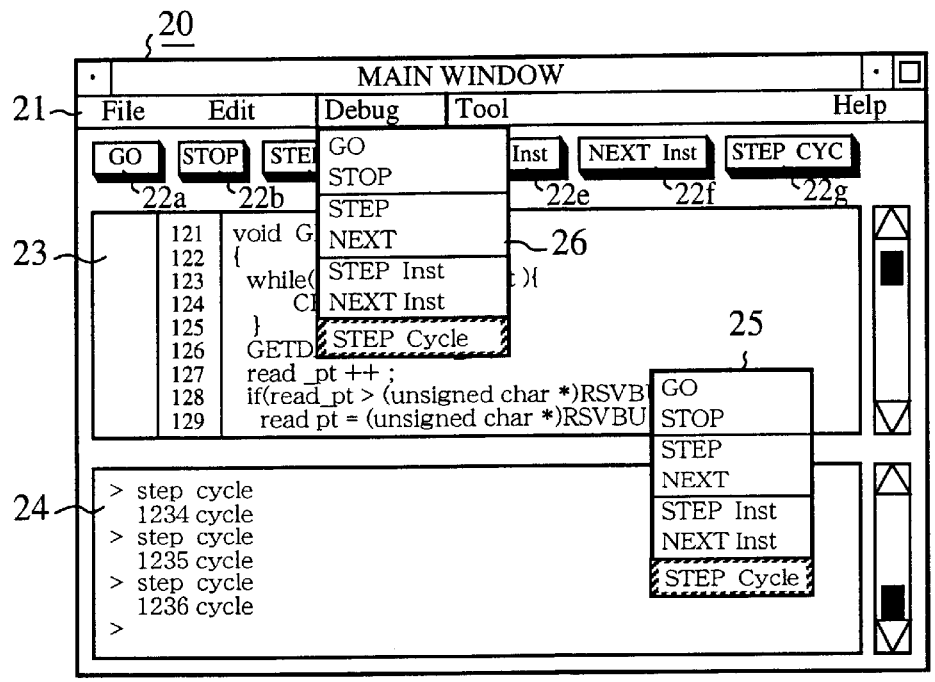
FIG. 19 is a view showing a case where a pull-down menu is further displayed on the screen display of FIG. 18.

Referring next to FIG. 18, there is illustrated a view showing an example of a screen display produced by the user interface unit 12. In the figure, the same reference numerals as shown in FIG. 13 designate the same elements as of the screen display of FIG. 13, and therefore the description of the elements will be omitted hereinafter. In FIG. 18, reference numeral 22g denotes a STEP CYC button for starting execution of a source program step by step in units of a cycle (or clock). Needless to say, the name of the button 22g is not limited to "STEP CYC". FIG. 19 is a view showing an example of a screen display when a user selects Debug in a menu bar 21 by clicking on the menu item with a mouse for example.

Next, a description will be made as to the difference between the operation of the source-level debugger of the fifth embodiment and that of the source-level debugger of the aforementioned fourth embodiment. When a user enters a STEP CYC command by choosing the STEP CYC button 22g using a mouse or the like, choosing the STEP CYC menu item in a pop-up menu 25 or a pull-down menu 26, or typing in "step cycle" in a command window 24, the source-level debugger 1 starts executing a source program loaded thereinto step by step in units of a cycle (or clock). When a STEP or STEP Inst command is issued, the source-level debugger 1 starts execution of the source program loaded thereinto step by step in units of an instruction written in either a high-level language such as C language or an assembly language. In contrast, when the STEP CYC command is issued, the source-level debugger 1 starts execution of the source program loaded thereinto step by step in units of one processor cycle.

Figure 20:
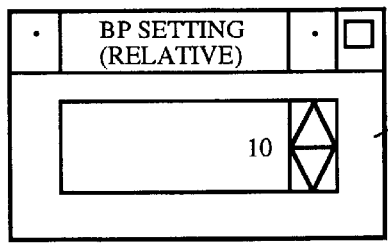
FIGS. 20(a) and 20(b) are views each showing a breakpoint setting window displayed by the source-level debugger according to the fifth embodiment of the present invention.
Figure 20:
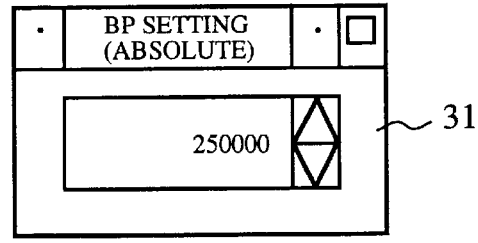
Figure 21:
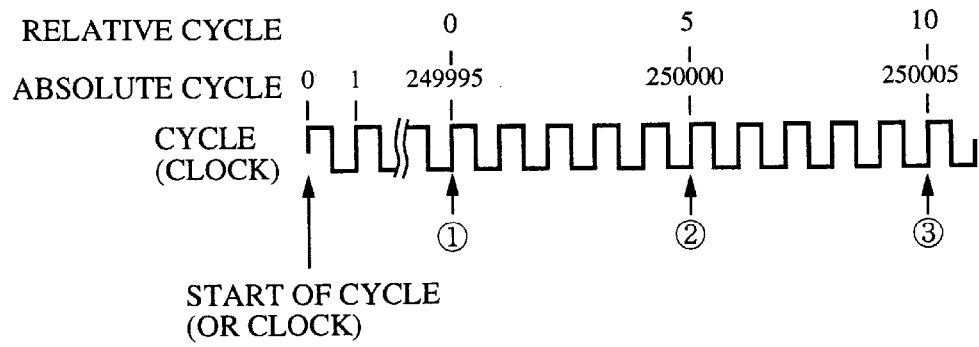
FIG. 21 is a timing chart for explaining relative and absolute clock cycles.

Referring next to FIGS. 20(a) and 20(b), there are illustrated views each showing an example of a breakpoint setting window for allowing users to set a breakpoint (or halt cycle) to halt the execution of a source program at the set halt clock cycle. The user interface unit 12 can display the input window on a display unit 2 according to an instruction from a halt condition setting unit 16. As shown in FIGS. 20(a) and 20(b), users can set a breakpoint (or halt cycle) to halt the execution of a source program at the set halt clock cycle by the relative number of cycles and/or the absolute number of cycles. The absolute number of cycles can be defined as a number obtained by starting counting the number of cycles when CPU is started or when a clock pulse is applied to CPU for the first time (i.e., when the execution of the source program is started). In contrast, the relative number of cycles can be defined as a number obtained by starting counting the number of cycles at 0 every time the execution of the source program is halted because of the execution of the STOP or STEP command, an instruction at which a breakpoint is placed, or the like. For example, when a user sets the relative number of cycles to 10 and the absolute number of cycles to 25,000, as shown in FIGS. 20(a) and 20(b), at the clock cycle ① of FIG. 21, the source-level debugger 1 halts the current source program execution at the clock cycler ② of FIG. 21 whose absolute value is 25,000. After that, when the source-level debugger 1 continues to execute the source program step by step, the source-level debugger 1 further halts the current source program execution at the clock cycle ③ of FIG. 21 whose absolute value is 25,005 (i.e., at the expiration of the relative number of cycles of 10 after the clock cycle ①. A given command can also be provided to allow users to set a breakpoint, specifying a clock cycle at which the execution of a source program is to be halted, by the relative number of cycles and/or the absolute number of cycles, in the command window 24.

Figure 22:
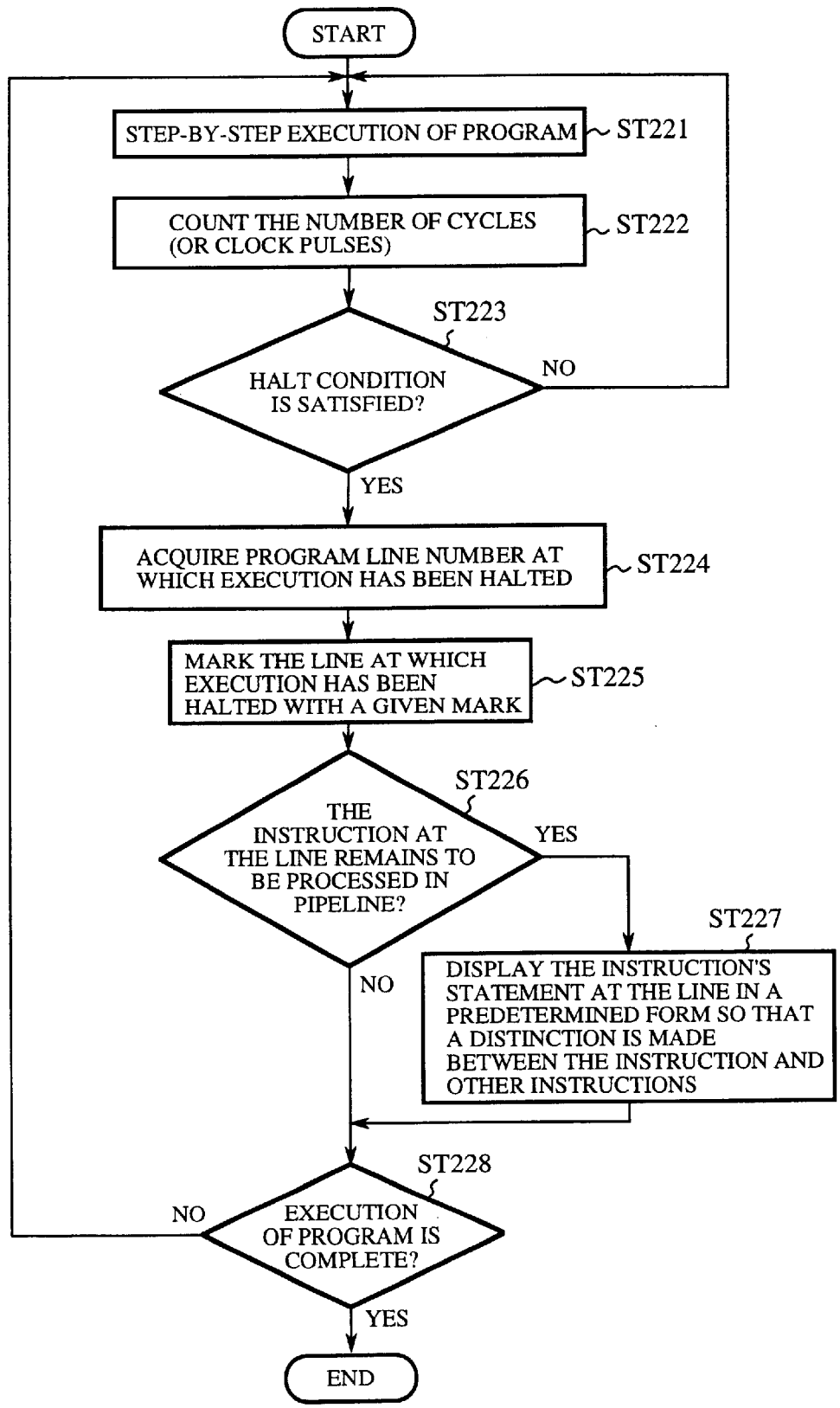
FIG. 22 is a flow diagram showing the operation of the source-level debugger according to the fifth embodiment of the present invention.

Referring next to FIG. 22, there is illustrated a flow diagram showing procedures of executing a source program step by step in units of one cycle by the source-level debugger 1 of the fifth embodiment. As shown in FIG. 22, when the STEP CYC command is issued in step ST221, the cycle step-by-step execution unit 17 of the source-level debugger 1 starts executing a source program loaded thereinto step by step in units of one clock cycle. The cycle step-by-step execution unit 17, in step ST222, counts the number of cycles (clock pulses) applied thereto after the current source program execution has been started. The cycle step-by-step execution unit 17 then, in step ST223, determines whether or not the current number of cycles is equal to one of halt cycles, each of which has been preset as a breakpoint of the source program that is defined as the relative or absolute number of cycles. Unless the current number of cycles is equal to any one of the preset halt cycles, the source-level debugger 1 returns to step ST221 wherein it advances the current source program execution by one clock cycle. In performing step ST223, if the current number of cycles is equal to one of the preset halt cycles, the cycle step-by-step execution unit 17, in step ST224, halts the execution of the source program and obtains a corresponding line number of the halted source program from the preset halt cycle. The cycle step-by-step execution unit 17 then, in step ST225, displays a given mark "→" 27b at the corresponding line of the halted source program. Simultaneously, the cycle step-by-step execution unit 17 displays a mark "○" 27a showing the breakpoint that the user has set at the instruction in advance at the same program line.

In performing step ST223, the cycle step-by-step execution unit 17 also determines whether a source program counter (not shown) has a value that satisfies a halt condition defined by the halt condition setting unit 16 in advance. Unless the value of the source program counter satisfies the halt condition, the source-level debugger 1 returns to step ST221. In contrast, if the value of the source program counter satisfies the halt condition, the cycle step-by-step execution unit 17, instep ST224, halts the execution of the source program and obtains a corresponding line number of the halted source program at which the execution of the source program has been halted.

The not-yet-processed instruction analyzing unit 11, in step ST226, determines whether the instruction or statement, at which the execution of the source program has been halted, has not finished writing data into both either a destination memory location or a destination register, and a corresponding variable (or whether there is a not-yet-processed instruction left), that is, whether the instruction has made updated data remain to be processed in the pipeline. When the instruction, at which the execution of the source program has been halted, has not finished writing data into both a destination memory location or a destination register, and a corresponding variable, the user interface unit 12, in step ST227, sets a specific character attribute to the statement's letters to display the instruction or statement, at which the execution of the source program has been halted, in the source window 23 so that a distinction is made between the instruction and other instructions. For example, the user interface unit 12 draws a box around the statement, as shown in FIG. 23(a). As an alternative, the user interface unit 12 displays the instruction in a color different from that in which other instructions are displayed in the source window 23, as shown in FIG. 23(b). In the example shown, when the user sets a breakpoint to an instruction "read_pt= 0×100" at the line No. 127 of the source program by entering "breakpoint 127" in the command window 24, and then enters the step cycle command to make the source-level debugger execute the source program step by step in units of one cycle, the source-level debugger halts the execution of the source program at the line No. 127 and shows that the instruction at the line No. 127 has not finished writing data into both either a destination memory location or a destination register, and a corresponding variable. That is, 0×100 has not been written into the variable "read_pt" in the above example as shown in FIG. 23(a) or 23(b).

As an alternative, the source-level debugger can blink or display the instruction, at which the execution of the source program has been halted, either in a font different from that in which other instructions are displayed, or using any combination of two or more of blinking, a character attribute, a color, a font, and so on. The not-yet-processed instruction analyzing unit can generate a given sound to inform users that the instruction, at which the execution of the source program has been halted, has not finished writing data into both a destination memory location or a destination register, and a corresponding variable, in addition to displaying the instruction in a predetermined display form in the source window 23.

As previously mentioned, in accordance with the fifth embodiment of the present invention, since the source-level debugger 1 can execute a source program step by step in units of one clock cycle, it can allow users to debug the source program in units of one clock cycle. In addition, the source-level debugger 1 can display an instruction that has not finished processing when the source program is halted or terminated so that a distinction is made between the instruction and other instructions, thus enabling users to easily recognize the instruction that has not finished processing completely.

Many widely different embodiments of the present invention may be constructed without departing from the spirit and scope of the present invention. It should be understood that the present invention is not limited to the specific embodiments described in the specification, except as defined in the appended claims.

What is claimed is:

1. A source-level debugger for debugging a source program for computers using a pipeline control method, said debugger comprising:

instruction analyzing means for analyzing each instruction in a pipeline which remain to be processed when execution of a source program is halted or terminated, and for acquiring information about an internal state of the pipeline; and displaying means for displaying the information about the internal state of the pipeline acquired by said instruction analyzing means in a predetermined display form;

wherein said instruction analyzing means includes means for keeping the internal state of the halted pipeline when the execution of the source program is halted or terminated; and means for identifying, when the internal state is kept, at least one of a determination memory location and a determination register and a corresponding variable therein, into which the data that remains to be processed in the pipeline is to be written so as to acquire the information about the internal state of the pipeline.

2. The source-level debugger according to claim 1, wherein said instruction analyzing means makes a predetermined sound if data remains to be processed in the pipeline when the execution of the source program is halted or terminated.

3. The source-level debugger according to claim 1, wherein if data, which is associated with each of the instructions, remains to be processed in the pipeline when the execution of the source program is halted or terminated, said instruction analyzing means retrieves the data directly from either a memory location or a register, which is a source of the data, and then furnishes the data as the information about the internal state of the pipeline to said displaying means, and wherein said displaying means displays the data that is to be written into at least one of a destination memory location and a destination register and a corresponding variable therein, which are identified by said instruction analyzing means, in the predetermined display form so that a distinction is made between the data and other data stored therein.

4. The source-level debugger according to claim 3, wherein said displaying means displays the data that is to be written into at least one of the destination memory location and the destination register and the corresponding variable therein in a color or font different from that in which other data are displayed.

5. The source-level debugger according to claim 3, wherein said displaying means blinks or sets a specific character attribute to the data that is to be written into at least one of the destination memory location and the destination register and the corresponding variable therein so that a distinction is made between the data and other data stored therein.

6. The source-level debugger according to claim 3, wherein said displaying means also displays current data stored in at least one of the destination memory location and the destination register and the corresponding variable therein, which are identified by said instruction analyzing means when the execution of the source program is halted or terminated, as well as the data that is to be written into at least one of the destination memory location and the destination register and the corresponding variable therein.

7. The source-level debugger according to claim 1, wherein said instruction analyzing means analyzes an instruction including stages of the instruction in a pipeline which remain to be processed when execution of a source program is halted or terminated, and then determines whether the instruction has made data remain to be processed in the pipeline, and wherein said displaying means displays an instruction that has been determined, as making data remain to be processed, by said instruction analyzing means, in a predetermined display form so that a distinction is made between the instruction and other instructions.

8. The source-level debugger according to claim 7, wherein said displaying means displays the instruction that has been determined, as making data remain to be processed, by said instruction analyzing means, in a color or font different from that in which other instructions are displayed.

9. The source-level debugger according to claim 7, wherein said displaying means blinks or sets a specific character attribute to the instruction that has been determined, as making data remain to be processed, by said instruction analyzing means, so that a distinction is made between the instruction and other instructions.

10. The source-level debugger according to claim 7, wherein said instruction analyzing means makes a predetermined sound if it determines that the instruction has made data remain to be processed in the pipeline.

11. The source-level debugger according to claim 1, wherein said instruction analyzing means comprises means for analyzing instructions in the pipeline which remain to be processed, and for, when updated data associated with each of the instructions remains to be processed in the pipeline, accessing to either a memory location at a specified address or a specified register storing the updated data so at to retrieve the updated data, instead of said means for keeping the internal state of the halted pipeline and said means for identifying at least one of the determination memory location and the determination register and the corresponding variable.

12. The source-level debugger according to claim 1, wherein said instruction analyzing means comprises means for determining whether the instruction has finished writing data into at least one of a destination memory location or a destination register, and a corresponding variable, instead of said means for keeping the internal state of the halted pipeline and said means for identifying at least one of a determination memory location and a determination register and a corresponding variable.

13. The source-level debugger according to claim 1, wherein said predetermined display form is for displaying at least one of the current data stored in at least one of the identified memory location and the identified register at the corresponding variable therein, current data stored in at least one of them, the data that is to be written into at least one of them, and the instruction that has been determined, as remaining to be processed in a color or font, or in blinking or setting a specific character attribute to the current data different from that in which other instructions are displayed.

14. A source-level debugger for debugging a source program for computers using a pipeline control method, said debugger comprising:

cache contents checking means for determining whether the contents of a cache memory, that has taken in the contents of part of a memory, match the contents of the part of the memory when execution of a source program is halted or terminated; and displaying means for displaying the contents of the memory in a predetermined display form so that a distinction is made between data that does not match corresponding data stored in the cache memory and data that does match corresponding data stored in the cache memory.

15. The source-level debugger according to claim 14, wherein said display means also displays corresponding data stored in the cache memory for at least the data stored in the memory which does not match the corresponding data stored in the cache memory.

16. The source-level debugger according to claim 14, wherein said predetermined display form is for displaying the data that does not match corresponding data stored in the cache memory in a color or font, or in blinking or setting a specific character attribute to the current data different from that data that does match corresponding data stored in the cache memory.

17. A source-level debugger for debugging a source program for computers using a pipeline control method, said debugger comprising:

cycle step-by-step execution means for executing the source program step by step in units of one cycle (or clock);

displaying means for producing a predetermined screen display including at least one of a button, a pull-down menu, a pop-up menu, and a window for allowing users to enter commands, which are used for starting said cycle step-by-step execution means in an interactive manner; and halt condition setting means for allowing users to set a breakpoint defined in units of one cycle to halt execution of a source program at the set breakpoint by at least either one of a relative number of cycles, which is obtained by starting counting the number of cycles at 0 every time the execution of the source program is halted, and an absolute number of cycles, which is obtained by starting counting the number of cycles when the execution of the source program is started.

* * * * *